US012416605B2

(12) United States Patent
Bivolarsky et al.

(10) Patent No.: US 12,416,605 B2
(45) Date of Patent: Sep. 16, 2025

(54) ACOUSTIC SIGNAL MATERIAL IDENTIFICATION WITH NANOTUBE COUPLANT

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); William Coleman, Tucson, AZ (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 18/616,718

(22) Filed: Mar. 26, 2024

(65) Prior Publication Data
US 2025/0052725 A1 Feb. 13, 2025

Related U.S. Application Data

(63) Continuation of application No. 18/223,987, filed on Jul. 19, 2023, now Pat. No. 11,940,420.
(Continued)

(51) Int. Cl.
G01N 29/28 (2006.01)
G01N 29/02 (2006.01)

(52) U.S. Cl.
CPC .......... *G01N 29/28* (2013.01); *G01N 29/02* (2013.01); *G01N 2291/022* (2013.01); *G01N 2291/106* (2013.01)

(58) Field of Classification Search
CPC ...................................... G01N 29/28
(Continued)

(56) References Cited

U.S. PATENT DOCUMENTS 2,449,054 A * 9/1948 Cantlin ............... G01F 23/0038
200/84 R
3,019,650 A * 2/1962 Worswick ........... G01F 23/2961
73/290 V
(Continued)

FOREIGN PATENT DOCUMENTS

CN 204944617 * 1/2016 ........... G01F 23/296
CN 105333925 * 2/2016 ........... G01F 23/296
(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.
(Continued)

Primary Examiner — Jacques M Saint Surin
(74) Attorney, Agent, or Firm — HAYES SOLOWAY P.C.

(57) ABSTRACT

A system and method for improved, non-intrusive material identification includes a vessel holding or transporting at least one quantity of a fluid. At least one acoustic transducer is positioned on an exterior surface of a sidewall of the vessel. At least one coupling layer is positioned between the at least one acoustic transducer and the exterior surface of the sidewall of the vessel, wherein the at least one coupling layer is formed, at least in part, from nanotubes, wherein the nanotubes improve a reflection of an acoustic signal emitted from the at least one acoustic transducer. A computerized device is in communication with the at least one acoustic signal. The computerized device has a processor and a memory, and determines a material identification of the quantity of fluid based on, at least in part, the reflection of the ultrasonic signal.

14 Claims, 13 Drawing Sheets

Related U.S. Application Data

(60) Provisional application No. 63/368,856, filed on Jul. 19, 2022.

(58) Field of Classification Search
USPC ............................................................. 73/628
See application file for complete search history.

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,208,908 A | 6/1980 | Hickox | G01F 1/66 |
| 4,280,126 A | 7/1981 | White | 340/621 |
| 4,320,659 A | 3/1982 | Lynnworth et al. | G01N 29/02 |
| 4,326,173 A | 4/1982 | Newman | H03L 7/08 |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghorn et al. | B65D 88/38 |
| 4,599,892 A | 7/1986 | Doshi | G01F 17/00 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,040,415 A | 8/1991 | Barkhoudarian | G01F 1/66 |
| 5,148,700 A | 9/1992 | King | G01N 15/00 |
| 5,195,058 A | 3/1993 | Simon | G01S 15/02 |
| 5,223,822 A | 6/1993 | Stommes et al. | G08B 7/06 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,453,944 A | 9/1995 | Baumoel | G06F 17/00 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,663,505 A | 9/1997 | Nakamura | G01L 9/0022 |
| 5,770,806 A | 6/1998 | Hiismaki | G01F 1/662 |
| 5,821,427 A | 10/1998 | Byrd | G01F 1/66 |
| 5,836,192 A | 11/1998 | Getman et al. | G01F 23/28 |
| 6,035,903 A | 3/2000 | Few et al. | B65B 1/04 |
| 6,105,431 A | 8/2000 | Duffill et al. | G01N 29/2487 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,354,147 B1 | 3/2002 | Gysling et al. | G01N 29/00 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,691,582 B1 | 2/2004 | Nawa et al. | G01F 1/66 |
| 6,836,734 B2 | 12/2004 | Rojas et al. | G06F 19/00 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamaya | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,359,803 B2 | 4/2008 | Gysling et al. | G01N 31/00 |
| 7,363,174 B2 | 4/2008 | Kishiro et al. | G01F 25/10 |
| 7,430,924 B2 | 10/2008 | Gysling et al. | G01F 1/00 |
| 7,437,946 B2 | 10/2008 | Gysling et al. | G01F 1/22 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,757,560 B2 | 7/2010 | Hofmann | G01R 33/20 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,346,491 B2 | 1/2013 | Loose et al. | G01F 1/00 |
| 8,482,295 B2 | 7/2013 | Sadri et al. | G01R 27/04 |
| 8,683,882 B2 | 4/2014 | Jackson | G01N 9/24 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,383,476 B2 | 7/2016 | Trehan et al. | G01V 11/00 |
| 9,557,208 B2 | 1/2017 | Kuroda et al. | G01F 23/28 |
| 9,772,311 B2 | 9/2017 | Liljenberg et al. | G01N 29/032 |
| 9,816,848 B2 | 11/2017 | Raykhman et al. | G01F 1/86 |
| 9,835,450 B2 | 12/2017 | Deleye et al. | G01N 29/069 |
| 9,891,085 B2 | 2/2018 | Muhammad et al. | G01F 1/88 |
| 9,903,840 B2 | 2/2018 | Altpeter et al. | G01N 29/04 |
| 10,122,051 B2 | 11/2018 | Kuhne et al. | H01M 10/484 |
| 10,180,410 B2 | 1/2019 | Takahashi et al. | G01N 29/043 |
| 10,215,613 B2 | 2/2019 | Kassubek et al. | G01F 23/296 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 11,047,721 B2 | 6/2021 | Schöb et al. | G01F 1/66 |
| 11,274,952 B2 | 3/2022 | Bober et al. | G01F 1/66 |
| 11,293,791 B2 | 4/2022 | Firouzi et al. | G01F 1/66 |
| 11,536,696 B2 | 12/2022 | Bivolarsky et al. | G01N 29/44 |
| 11,585,690 B2 | 2/2023 | Bivolarsky et al. | G01F 23/2965 |
| 11,729,537 B2 | 8/2023 | Heim et al. | G01N 29/221 |
| 11,788,904 B2 | 10/2023 | Bivolarsky et al. | G01K 3/14 |
| 2002/0170753 A1 | 11/2002 | Clare | G01G 19/22 |
| 2002/0173230 A1 | 11/2002 | Mayes | B24B 49/00 |
| 2004/0035208 A1 | 2/2004 | Diaz et al. | G01N 29/18 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0102109 A1 | 5/2005 | Dubois et al. | G01B 5/28 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0001028 A1 | 1/2007 | Gysling | B05B 7/30 |
| 2007/0068248 A1 | 3/2007 | Freger et al. | G01F 23/28 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0007678 A1 | 1/2009 | Fukutomi et al. | G02N 2/006 |
| 2009/0143681 A1 | 6/2009 | Jurvelin et al. | A61B 8/00 |
| 2010/0046576 A1 | 2/2010 | Desai | G01K 11/22 |
| 2010/0111133 A1 | 5/2010 | Yuhas et al. | G01K 17/00 |
| 2010/0199779 A1 | 8/2010 | Liu et al. | G01F 1/663 |
| 2010/0218599 A1 | 9/2010 | Young et al. | G01F 23/296 |
| 2010/0242593 A1 | 9/2010 | Lagergren et al. | G01F 23/296 |
| 2010/0307249 A1 | 12/2010 | Lesage et al. | G01N 29/04 |
| 2011/0029262 A1 | 2/2011 | Barkhouse | 702/55 |
| 2011/0048551 A1 | 3/2011 | Tanaka et al. | 137/486 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |
| 2012/0173169 A1 | 7/2012 | Skelding | G06F 19/00 |
| 2012/0222471 A1 | 9/2012 | Raykhman et al. | G01N 29/02 |
| 2012/0226159 A1 | 9/2012 | Sinclair et al. | G01S 7/52046 |
| 2012/0259560 A1 | 10/2012 | Woltring et al. | 702/55 |
| 2012/0262472 A1 | 10/2012 | Garr et al. | G06T 11/206 |

(56) References Cited

U.S. PATENT DOCUMENTS

| | | | |
|---|---|---|---|
| 2012/0265454 A1 | 10/2012 | Rudd et al. | G01F 1/66 |
| 2012/0281096 A1 | 11/2012 | Gellaboina et al. | G01S 15/89 |
| 2013/0002443 A1 | 1/2013 | Breed et al. | G08B 21/00 |
| 2013/0041597 A1 | 2/2013 | Deleye et al. | G01N 29/043 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0068311 A1 | 3/2015 | Tanaka et al. | G01N 17/00 |
| 2015/0075278 A1 | 3/2015 | Dockendorff et al. | G01F 23/296 |
| 2015/0177045 A1 | 6/2015 | Cobianu et al. | G01F 23/296 |
| 2015/0198471 A1 | 7/2015 | Furlong et al. | G01F 1/66 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0109304 A1 | 4/2016 | Yan et al. | G01K 15/00 |
| 2016/0146653 A1 | 5/2016 | Skelding | E21B 21/01 |
| 2016/0169839 A1 | 6/2016 | Gottlieb et al. | G01N 29/02 |
| 2016/0216141 A1 | 7/2016 | Leaders et al. | G01F 1/66 |
| 2016/0265954 A1 | 9/2016 | Bachmann et al. | G01F 1/667 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0097322 A1 | 4/2017 | Giese et al. | G01N 29/07 |
| 2017/0102095 A1 | 4/2017 | Kunita et al. | F16K 37/0091 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0295743 A1 | 10/2017 | Brown et al. | A01J 5/0133 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0113663 A1 | 4/2018 | Jain | G06F 3/14 |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0154480 A1 | 5/2019 | Schöb et al. | G01F 1/662 |
| 2019/0195629 A1 | 6/2019 | Vaissiere | G01C 9/00 |
| 2019/0195830 A1 | 6/2019 | Tamura et al. | |
| 2019/0272496 A1 | 9/2019 | Moeller | G06Q 10/087 |
| 2019/0368908 A1 | 12/2019 | Aughton et al. | G01F 1/66 |
| 2020/0018628 A1 | 1/2020 | Head et al. | G21C 17/022 |
| 2020/0182736 A1 | 6/2020 | Kim et al. | G01M 3/2807 |
| 2020/0195449 A1 | 6/2020 | Obaidi | H04L 9/38 |
| 2020/0200711 A1 | 6/2020 | Fehran et al. | G01N 29/024 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0034850 A1 | 2/2022 | Zhang et al. | G01N 29/22 |
| 2022/0178879 A1 | 6/2022 | Bivolarsky et al. | G02N 29/028 |
| 2022/0178881 A1 | 6/2022 | Bivolarsky et al. | G01N 29/04 |
| 2022/0276102 A1 | 9/2022 | Bivolarsky et al. | G01K 11/24 |
| 2023/0258488 A1 | 8/2023 | Coleman et al. | G01F 1/66 |

FOREIGN PATENT DOCUMENTS

| | | | |
|---|---|---|---|
| CN | 105548370 | 5/2016 | G01N 29/24 |
| DE | 10 2010 029 254 | 12/2011 | F01N 3/10 |
| EP | 0372700 | 6/1990 | G01F 23/28 |
| EP | 2450701 | 5/2012 | G01N 29/22 |
| EP | 2962096 | 8/2019 | G01L 1/255 |
| GB | 2192717 | 1/1990 | G01N 29/00 |
| JP | H1073385 | 3/1998 | F28D 15/02 |
| JP | 2000314651 | 11/2000 | G01F 23/28 |
| JP | 2002340654 | 11/2002 | G01F 23/28 |
| JP | 2013140029 | 7/2013 | F01K 5/02 |
| KR | 200174618 | 3/2000 | G01N 29/24 |
| WO | WO 87/04793 | 8/1987 | G01N 29/00 |
| WO | WO 8809895 | 12/1988 | F16K 37/00 |
| WO | WO 9010849 | 9/1990 | G01F 23/28 |
| WO | WO 2007/149605 | 12/2007 | |
| WO | WO 2008/079202 | 7/2008 | G01F 3/36 |
| WO | WO 2009/154719 | 12/2009 | G01F 17/00 |
| WO | WO 2014/021846 | 2/2014 | G01F 1/66 |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018), 10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pepperl + Fuchs, "The Pulse of Automation", Technology Guide Ultrasonics by Pepperl + Fuchs, Germany 2017. Retrieved from https://www.pepperl-fuchs.com/global/en/36955.htm, 7 pgs.

(56) References Cited

OTHER PUBLICATIONS

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.
Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.
"TOPS Terminal Operating Practices Symposium" Program Agenda, Apr. 11, 2018, 1 page.
Zadler, et al., "Resonant Ultrasound Spectroscopy: theory and application", Geophysical Journal International, vol. 156, Issue 1, Jan. 2004, pp. 154-169.
Vermeersch, "Influence of substrate thickness on thermal impedance of microelectronic structures", Microelectronics Reliability, 47, 2007, pp. 437-443.
Alpha Chemistry website, "Carbon nanotube sheet", https://graphene.alfa-chemistry.com/product/carbon-nanotube-sheet-cas-308068-56-6-330280.html?nid=_, accessed Oct. 17, 2023, 6 pgs.
Attiya, "Lower Frequency Limit of Carbon Nanotube Antenna", Progress in Electromagnetics Research, PIER 94, 2009, pp. 419-433, 16 pgs.
Ayub et al., "Acoustic absorption behaviour of carbon nanotube arrays", Inter-Noise 2014, Melbourne Australia, Nov. 16-19, 2014, 10 pgs.
Calculla.com "Acoustic impedance of various materials table", https://calculla.com/acoustic_impedance, accessed Oct. 18, 2023, 4 pgs.
Chico et al., "Pure Carbon Nanoscale Devices: Nanotube Heterojunctions", Physical Review Letters, vol. 76, No. 6, Feb. 5, 1996, 4 pgs.
Ciplys, et al., "Attenuation of Surface Acoustic Waves by Carbon Nanotubes", Materials Research Society, vol. 750, 2003, 6 pgs.
Cong et al., "Probing the acoustic phonon dispersion and sound velocity of graphene by Raman Spectroscopy", Carbon 149, 2019, pp. 19-24, 6 pgs.
Delogu et al., "Functionalized multiwalled carbon nanotubes as ultrasound contrast agents", PNAS, vol. 109, No. 41, Oct. 9, 2012, 6 pgs.
Dumitrica, et al., "Strain-rate and temperature dependent plastic yield in carbon nanotubes from ab initio calculations", Applied Physics Letters, vol. 84, No. 15, Apr. 12, 2004, 3 pgs.
Eatemadi et al., "Carbon nanotubes: properties, synthesis, purification, and medical applications", Nanoscale Research Letters, 2014, 13 pgs.
Engineering Toolbox website, "ASTM D3035—Polyethylene PE pipes—dimensions", https://www.engineeringtoolbox.com/ASTM-D3035-PE-pipes-d_2138.html , accessed Oct. 17, 2023, 9 pgs.
Garcia-Gancedo et al., "AlN-based BAW resonators with CNT electrodes for gravimetric biosensing", Sensors and Actuators B: Chemical, 2011, 8 pgs.
Huang et al., "Kink Formation and Motion in Carbon Nanotubes at Hight Temperatures", Physical Review Letters, PRL 97, Aug. 18, 2006, 4 pgs.
Huang et al, "Superplastic carbon nanotubes", Nature, vol. 439, Jan. 19, 2006, 1 pg.
Iborra et al., "Acoustic Properties of Carbon Nanotube Electrodes in BAW Resonators", IEEE, 2013, pp. 984-987, 4 pgs.
Iijima et al., "Single-shell carbon nanotubes of 1-nm diameter", Nature, vol. 363, Jun. 17, 1993, 3 pgs.
Iijima, "Helical microtubules of graphitic carbon", Nature, vol. 354, Nov. 7, 1991, 3 pgs.
Kim et al., "Direct Observation of Localized Defect States in Semiconductor Nanotube Junctions", Physical Review Letters, vol. 90, No. 21, May 30, 2003, 4 pgs.
Kozlov et al., "Sound of carbon nanotube assemblies", J. Appl Phys. 105, 2009, Abstract only, 1 pg.
Magnin, et al., "Collapse phase diagram of carbon nanotubes with arbitrary number of walls. Collapse modes and macroscopic analog", Carbon 179, 2021, pp. 552-562, 11 pgs.
Minary-Jolandan et al., "Reversible radial deformation up to the complete flattening of carbon nanotubes in nanoindentation", Journal of Applied Physics, 103, 2008, 5 pgs.
Mori et al., "Energetics of plastic bending of carbon nanotubes", Physical Review B 74, 2006, 5 pgs.
Nakayama et al., "Current-Induced Plastic Deformation of Double-Walled Carbon Nanotubes", Japanese Journal of Applied Physics, vol. 44, No. 23, 2005, pp. L720-L722, 4 pgs.
NanoWerk website, https://www.nanowerk.com/nanotechnology/introduction/introduction_to_nanotechnology_22.php accessed Oct. 17, 2023, 14 pgs.
Nardelli et al., "Mechanism of strain release in carbon nanotubes", Physical Review B, vol. 57, No. 8, Feb. 15, 1998, 4 pgs.
NDTNet website, https://www.ndt.net/links/proper.htm. accessed Oct. 17, 2023, 2 pgs.
Ouyang et al., "Atomically Resolved Single-Walled Carbon Nanotube Intramolecular Junctions", Science, vol. 291, No. 5501, Jan. 5, 2021, pp. 97-100, 5 pgs.
Palaci et al., "Radial elasticity of multi-walled carbon nanotubes", Physical Review Letters, vol. 94, No. 17, 2005, 5 pgs.
PVC Pipe Dimensions—Schedule 40, https://www.pvcfittingsonline.com/resource-center/pvc-pipe-dimensions-18-through-24/, accessed Oct. 17, 2023, 2 pgs.
"Velocity Speed of Sound in Various Materials—RF Cafe", https://www.rfcafe.com/references/general/velocity-sound-media.htm, accessed Oct. 17, 2023, 3 pgs.
Rudoff et al., "Radial deformation of carbon nanotubes by van der Waals forces", Nature, vol. 364, Aug. 5, 1993, 3 pgs.
Sato, "Elastic and Plastic Deformation of Carbon Nanotubes", Procedia Engineering, 14, 2011, pp. 2366-2372, 7 pgs.
Shima, et al., "Chapter 6, Topological Defects", Elastic and Plastic Deformation of Carbon Nanotubes, CRC Press, pp. 81-98, 2013, 18 pgs.
Signal Processing website, https://www.signal-processing.com/table.php, accessed Oct. 17, 2023, 3 ps.
TEPPFA, "Fast Guide to Materials", https://www.teppfa.eu/benefits-of-plastic-pipes-and-fittings/fast-guide-to-materials/, accessed Oct. 17, 2023, 2 pgs.
Wikipedia "Carbon nanotube", https://en.wikipedia.org/wiki/Carbon_nanotube, accessed Oct. 17, 2023, 35 pgs.
Wikipedia "Mechanical properties of carbon nanotubes", https://en.wikipedia.org/wiki/Mechanical_properties_of_carbon_nanotubes, accessed Oct. 17, 2023, 6 pgs.
Wikipedia, "Speed of Sound", https://en.wikipedia.org/wiki/Speed_of_sound, accessed Oct. 17, 2023, 19 pgs.
Yang et al., "Radial elasticity of single-walled carbon nanotube measured by atomic force microscopy", Applied Physics Letters, 98, 2011, 3 pgs.
Yoon et al., "Sound wave propagation in multiwall carbon nanotubes", J. Appl. Phys. 93, 2003, Abstract only, 1 pg.
Yu, et al., "Strength and Breaking Mechanism of Multiwalled Carbon Nanotubes Under Tensile Load", Science, vol. 287, Jan. 28, 2000, 4 pgs.
Yu, et al., "Investigation of the Radial Deformability of Individual Carbon Nanotubes under Controlled Indentation Force", Physical Review Letters, vol. 85, No. 7, Aug. 14, 2000, 4 pgs.
Zhang et al., "Plastic Deformations of Carbon Nanotubes", Physical Review Letters, vol. 81, No. 24, Dec. 14, 1998, 4 pgs.
Zhou et al., "Formation energy of Stone-Wales defects in carbon nanotubes", Applied Physics Letters, vol. 83, No. 6, Aug. 11, 2003, 3 pgs.

* cited by examiner

ACOUSTIC SIGNAL MATERIAL IDENTIFICATION WITH NANOTUBE COUPLANT

CROSS REFERENCE TO RELATED APPLICATION

This application is a continuation of U.S. patent application Ser. No. 18/223,987 filed Jul. 19 2023, which in turn claims benefit of U.S. Provisional Application Ser. No. 63/368,856 entitled, "Acoustic Signal Material Identification with Nanotube Couplant" filed Jul. 19, 2022, the entire disclosure of which is incorporated herein by reference.

FIELD OF THE DISCLOSURE

The present disclosure is generally related to acoustic signal material detection, and more particularly is related to acoustic signal material identification with nanotube couplant.

BACKGROUND OF THE DISCLOSURE

Pipes and pipelines are commonly used in a variety of industries to transport fluids. For instance, water pipes transport potable and sewer water in urban areas, pipes are used to transport chemicals within factories, and pipelines are used within the oil and gas industry for transporting petroleum products within refineries or between various locations. Similarly, various containers and vessels are often used to store fluids, such as oil storage tanks, chemical storage vessels, and the like. To determine the type of fluid within the vessel, container, pipes, or pipelines, acoustic-based sensors can be used to determine characteristics of the fluid which can be used to then identify the material type or material identity of the fluid.

Acoustic signals are commonly used for determining material identity of fluids, or otherwise assessing fluids and other materials within containers and pipelines, including those used to store oil and gas within the petroleum industry. There are many reasons to use acoustic waves for measurements of fluids or materials in a container or other type of enclosure. For instance, some containers are not easily accessible, such as underground storage tanks and large, multi-story fuel storage containers. Acoustic waves for measurements are also especially useful for metal enclosures and other non-transparent enclosures that encapsulate potentially hazardous materials, such as oil, gas, fuel, and various chemicals at different temperatures. These may be prevalent in processing plants, chemical plants, food industry plants, nuclear power stations, power grid transformers, and refineries.

However, despite the ability to use acoustic signals for determining material identity and otherwise assessing fluids and materials, such an approach is often complicated by faulty or subpart acoustic signal transmissions. In many cases, the acoustic signal transmission may be weakened or altered based on the surrounding environment or the materials within the acoustic signal transmission path. When acoustic signal transmissions are faulty or inaccurate, they lead to inaccurate readings which provide inaccurate results.

Thus, a heretofore unaddressed need exists in the industry to address the aforementioned deficiencies and inadequacies.

SUMMARY OF THE DISCLOSURE

Embodiments of the present disclosure provide a system for improved, non-intrusive material identification. Briefly described, in architecture, one embodiment of the system, among others, can be implemented as follows. A vessel is holding or transporting at least one quantity of a fluid. At least one acoustic transducer is positioned on an exterior surface of a sidewall of the vessel. At least one coupling layer is positioned between the at least one acoustic transducer and the exterior surface of the sidewall of the vessel, wherein the at least one coupling layer is formed, at least in part, from nanotubes, wherein the nanotubes improve a reflection of an acoustic signal emitted from the at least one acoustic transducer. A computerized device is in communication with the at least one acoustic signal, the computerized device having a processor and a memory, wherein the computerized device determines a material identification of the quantity of fluid based on, at least in part, the reflection of the ultrasonic signal.

The present disclosure can also be viewed as providing methods for improved, non-intrusive material identification. In this regard, one embodiment of such a method, among others, can be broadly summarized by the following steps: holding or transporting at least one quantity of a fluid in a vessel; positioning at least one acoustic transducer on an exterior surface of a sidewall of the vessel; positioning at least one coupling layer between the at least one acoustic transducer and the exterior surface of the sidewall of the vessel, wherein the at least one coupling layer is formed, at least in part, from nanotubes, wherein the nanotubes improve a reflection of an acoustic signal emitted from the at least one acoustic transducer; and using a computerized device in communication with the at least one acoustic signal, the computerized device having a processor and a memory, determining a material identification of the quantity of fluid based on, at least in part, the reflection of the ultrasonic signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
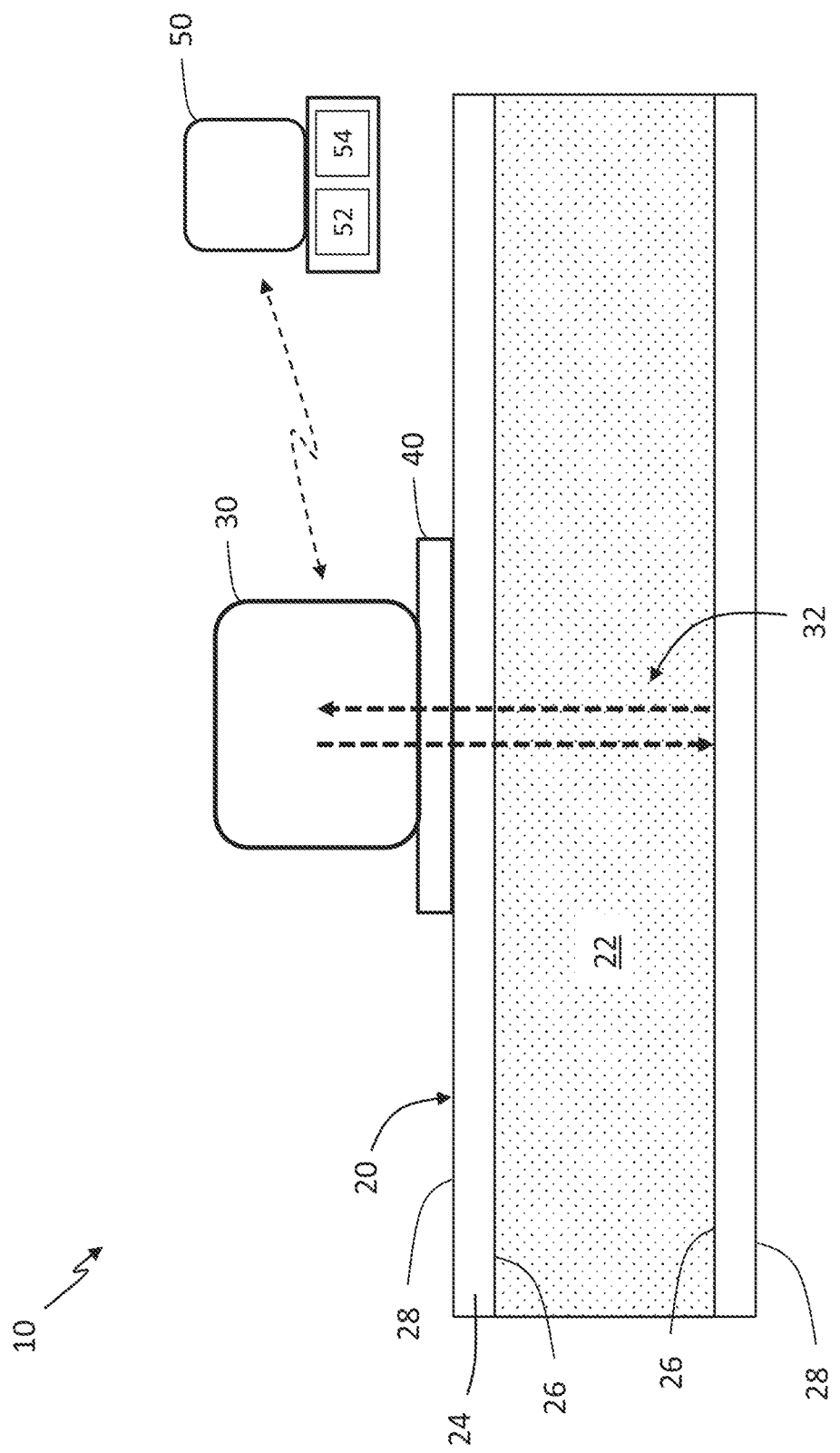
FIG. 1 is a diagrammatical illustration of a system for non-intrusive material identification, in accordance with exemplary embodiments of the present disclosure.

In the current era of nanotechnology, a variety of nanotube constituents are available which can be formed into nanoscopic fibers, for instance: carbon nanotubes or nanotubes created from other material or their composites. Advances in nanotechnology have provided acoustic researchers with a number of new materials with nanofibers and nano-pores that can potentially be used in transducer design and as coupling layers. Multiple composite materials were created to explore the capabilities on nanotubes which are waiting for utilization in various industries.

The extraordinary thermal and elastic properties of graphene have attracted great attention in its fundamental research and practical applications. Most of the physical properties of carbon nanotubes (CNTs) derive from graphene. In graphene, carbon atoms are densely organized in a regular bonded atomic-scale honeycomb (hexagonal) pattern, and this pattern is a basic structure for other carbon bonded materials (allotropes) such as fullerenes and carbon nanotubes. Carbon nanotube is a cylinder fabricated of rolled up grapheme sheet. Nanotubes can be single-walled carbon (and/or other materials) nanotubes (SWCNTs) and multiwalled carbon (and/or other materials) nanotubes (MWCNTs). Multi-walled nanotubes are multiple concentric nanotubes precisely nested within one another, which can be aligned in one direction and implemented as an array. The MWCNTs are just connected with Van der Waals forces, and no binder material is needed.

The CNT's have high anisotropic transport properties, including electrical conductivity and thermal conductivity. CNT hexagon two-dimensional structure shows high level of crystal quality. MWCNT show in addition striking telescoping property whereby an inner nanotube core may slide, almost without friction, within its outer nanotube shell, thus creating an atomically perfect linear or rotational motion that shows nearly no friction.

Chemical reactivity is a huge impetus for material identification applications where chemical substances undergo chemical reactions and this is usually coupled with an overall release of significant energy leading to extreme temperatures in the reactor itself or the walls of the container encapsulating the reactor. This may allow for material identification applications in harsh environments. The CNT specific strength is several orders of magnitude higher than steel as versus the stainless steel 63.1 kN·m·kg$^{-1}$ or high-carbon steel 154 kN·m·kg$^{-1}$. Temperatures that CNT's can withstand are until 2500 F and 1000 F, although in vacuum their resistance is close to the theoretical 4000 F. The CNT's can transmit a wide range of frequencies without significant absorption.

The unique properties of the carbon nanotubes make them ideal material for identification of material properties in multi-layered applications. Both single walled CNTs as well as CNTs with multi-walled structures may be used. MWCNTs are components of acoustic sensor design in the non-destructive material properties analysis and more scenically but not limited to ultrasonic testing. This approach presents implementation of the emerging molecular nanotechnology where precise positioning of atoms is applied to create useful machines and allows for exploration of quantum effects combined with electrical and mechanical dynamic of the nano material in measurements of the target material properties and environmental conditions like density and temperature as one example.

Although a number of applications of CNTs in noise management have been suggested their acoustic properties have not been widely studied. Nano technology enabled ultrasonic transducer and couplant design for material identification applications with wide frequency range and low energy loss that are capable of withstanding substantial heat and virtually no chemical reactivity for applications in harsh environments may be used, but many other applications are envisioned.

CNT/MWCNT arrays will guide the development of an effective acoustic transducers and coupling layers which will make use of various arrangements and compositions of (carbon, non-carbon, or composite) nanotube arrays.

The strength and flexibility of carbon nanotubes make them of potential use in controlling other nanoscale structures, which suggests they will have a significant role in nanotechnology engineering. Carbon can bond in different ways to construct structures with completely different properties. This may enable transducers to bond to materials without an added coupling.

Further efforts to quantify the acoustic characteristics and absorption performance of nanoscopic fibers and acoustic absorption coefficient of vertically aligned carbon nanotube (CNT) arrays will improve the design of coupling layers and transducers.

Typical piezoelectric ultrasonic transducer under free conditions loose significant power when converting electrical energy to mechanical due to the contributions of the mechanical and electric power losses. The losses in a Langevin ultrasonic transducer can be divided into three parts: dielectric loss of piezoelectric, structural damping loss of the transducer's mechanical components, and losses due to the friction of contact surfaces. Estimate dielectric losses of the piezoelectric ceramic can been measured directly. Dielectric power loss is obtained by calculating the electrical energy stored in a piezoelectric and using the loss factors.

The structural damping of the mechanical components of the transducer is calculated using the mechanical quality factors of each component. The factors have been measured using the standard modal tests. Structural power losses are obtained by calculating the elastic energy stored in each component and using the mechanical quality factors. Based on the calculations for the transducer with the resonance frequency of 20 kHz, under free conditions, the input power is 532 W, the total structural power loss at the resonance frequency is 221.82 W, the dielectric power loss is 15 W, and the power loss due to friction is 184.18 W. In this example nearly 80% of the energy is lost and in practice the losses can be higher due to using different frequencies in addition to impedance acoustic mismatch. Bulk of the losses in the above example are in the resonating element, therefore any improvement of the material used to generate (or convert from electrical) the mechanical waves will contribute to significant improvement of signal output without using additional input energy.

These losses can be mitigated by the use of multiwalled nanotubes of any type of material where the internal tubes slide nearly without any friction. Kinetic properties of single- and multi-walled nanotubes (like CNT's or MWCNT) or flat two-dimensional sheets (Graphene in the case of pure carbon) of nanomaterials will serve dual purposes of filters to reduce the noise or remove unwanted signals from the receiving transducer and eliminate unwanted signals when reflecting from the outside wall surface. Thus, improving the noise to signal ratio or selecting specific signals to measure. This way it is possible to select the information desired by selecting an appropriate nano technology enabled material and designing the appropriate internal metamaterial architecture with desired properties that will serve also as couplant in addition to transducer. They will be either implemented as a simple solution or in part of multilayered coupling or multipart transducer solution.

One part of any couplant or transducer design which may be important is the impedance of the material that is being investigated, such as, for example, the impedance of the outside layer of a container. When a multi-layered material is investigated, the maximum signal energy in a specific layer may depend on the losses in the surrounding layers. Therefore, it may be prudent to consider the system of material in its entirety to resolve the issue of signal strength.

Couplant layers can be assembled from nanomaterials in many forms like multi-layered graphene sheets of other two-dimensional single layer atomic sheets of mixed types of atoms and molecules that produce the correct impedance, adhesiveness and material mechanical properties needed for the couplant is a specific application. Additionally, nano tubes, nano spheres from different materials or mixtures can be used to create need impedance and mechanical response.

Multiple layers of materials may often perform better than a signal layer where the ideal material interface for one couplant layer or multiple layers can be calculated. In the case of multiple layers, it may be possible to perfect for all the layers at the same time. This optimization may start from the top layer and continue down to the last layer, as the perfect match for both layers is calculated in each step. It may be possible to change the number of layers, and the size of the step in terms of impedance may change during the optimization algorithm in the method described herein.

The layer(s) in the couplant can be mixture from nano components an any other materials including gels including but not limited to some of the existing couplants on the market.

The multiple layers may or may not be only from nanomaterials or materials enhanced with nano materials in any form, i.e., randomly distributed through the host material of oriented in some fashion.

The subject disclosure is directed to the nanotube enabled systems and methods for improved transducer and couplant performance in ultrasonic applications for material identity detection and other material characteristic assessment. FIG. 1 is a diagrammatical illustration of a system for non-intrusive material identification 10, in accordance with exemplary embodiments of the present disclosure. The system for non-intrusive material identification 10, which may be referred to as 'system 10' includes a vessel 20 holding or transporting at least one quantity of a fluid 22. As shown, the vessel 20 is depicted as a pipeline having a fluid 22 which may move through the vessel 20 in one or more directions, but the vessel 20 may also include any other type of fluid containment or transportation device or system. For instance, the vessel 20 may be a storage tank, a container, a network of pipes, a holding facility, or another similar structure. As shown in FIG. 1, the vessel 20 includes a sidewall 24 having an interior surface 26 which forms the interior passageway or compartment for fluid 22 storage or transportation. An exterior of the sidewall 24 is defined by an exterior surface 28 which is positioned opposite the interior surface 26 across the sidewall 24. Commonly, the exterior surface 28 may be exposed to the surrounding environment in which the vessel 20 is located. The exterior surface 28 may be encapsulated or covered, or it may be directly exposed to a surrounding environment.

The fluid 22 within the vessel 20 may include any type of fluid, such as, for instance, oil, gas, fuel, a chemical, water, a composition of materials, or any other type of material or mix of materials. In this disclosure, oil and gas are used as exemplary fluids 22 to provide clarity in disclosure.

At least one acoustic transducer 30 is positioned on an exterior surface 28 of the sidewall 24 of the vessel 20. The acoustic transducer 30 may be an acoustic or ultrasonic sensing device which is capable of emitting one or more acoustic or ultrasonic signals 32, e.g., an ultrasonic wave with particular characteristics, and may be capable of receiving one or more acoustic or ultrasonic signals 32. As shown in FIG. 1, the acoustic signals 32 may include a signal emitted from the acoustic transducer 30 into the vessel 20 and a reflection of that emitted signal 32 back to the acoustic transducer 30. Any number of acoustic transducers 30 may be included on the vessel 20, and the acoustic transducers 30 may be positioned in various locations or patterns. For instance, it may be possible for acoustic transducers 30 to be positioned in a linear configuration along a vessel 20, such as horizontally along a pipeline or vertically along a storage vessel. In another example, acoustic transducers 30 may be positioned axially about a vessel 20, spiraled about a vessel 20, positioned at substantially equidistant locations about a perimeter or circumference of a vessel 20, or in another configuration, all of which are considered within the scope of the present disclosure.

Acoustic signals 32 are capable of being emitted into a sidewall 24 of a vessel 20 by the acoustic transducer 30, whereby the signals 32, or a portion thereof, move through the sidewall 24 proximate to the mounting location of the acoustic transducer 30, and into the fluid 22 within the vessel 20. All or a portion of the signals 32 may contact the opposing sidewall 24, e.g., distal or opposite from where the acoustic transducer 30 is mounted, where all or a portion of those signals 32 are reflected back to the acoustic transducer.

The acoustic transducer 30, or another acoustic transducer 30, may sense the reflected signal.

At least one computerized device 50 may be in communication with the acoustic transducer 30, or any portion of a plurality of acoustic transducers, such that the computerized device 50 can receive the acoustic signal 32 or data derived from the acoustic signals 32. The computerized device 50 may include any computer having a memory 52 and a processor 54 which is capable of executing instructions for performing functions. The computerized device 50 may be in communication with the acoustic transducer 30 through any type of communication network, such as a wired or wireless network, direct or indirect, as well as be in communication with other devices, such as other computers, other networks, the Internet, or other computing architecture. The computerized device 50 may determine the material identity of the fluid 22 within the vessel 20, or otherwise assess or determine a characteristic or property of the fluid 22 or the sidewall 24 of the vessel, based at least in part on the acoustic signal 32.

To improve signal transmission into the sidewall 24 of the vessel 20, at least one coupling layer 40 may be positioned between the at least one acoustic transducer 30 and the exterior surface 28 of the sidewall 24 of the vessel 20. The couplant 40 may be formed, at least in part, from nanotubes, which may include nano particles or similar nano-materials, whereby the nanotube couplant improves reflection of the signal 32 emitted from the at least one acoustic transducer 30. In one example, the nanotube couplant may be formed from a couplant material with the addition of a nanotube materials, and optionally, other materials. The nanotube couplant 40 may help ensure that the system with the acoustic transducer 30 can be used for material identification applications with wide frequency range and less energy loss. Additionally, the nanotube couplant 40 may allow the acoustic transducer 30 to be capable of withstanding substantial heat and low chemical reactivity for applications in harsh environments.

In use, most materials which receive acoustic signals, despite being tactically smooth, are often very uneven on their surfaces, such that there are numerous inequalities, pits, cavities, or textures on the surface. On a micro-level, these inequalities trap air and other materials, which reduce the surface through which signals can be transmitted. The use of the nanotube couplant 40 acts to fill in these inequalities and gaps, such that there is a more homogeneous surface and material through which signals can be sent, which in turn, allows for signals to pass with greater energy. Building single or multiple layer nano particles for a nano layer may allow for the nano particles to coat the uneven parts of each surface so it is possible to use middle layer or layers for effective energy transfer among rigid objects.

The nanotube couplant 40 can be used in various different configurations. For example, as shown in FIG. 1, a nanotube couplant 40 may be positioned between the acoustic transducer 30 and the sidewall 24 of the vessel 20 in a location proximate to just that acoustic transducer 30. In this configuration, the signals 32 are emitted through the nanotube couplant 40, which helps ensure there is less energy loss in the signal transmission through the sidewall 24, as compared to non-nanotube couplants or no couplant at all.

Figure 2:
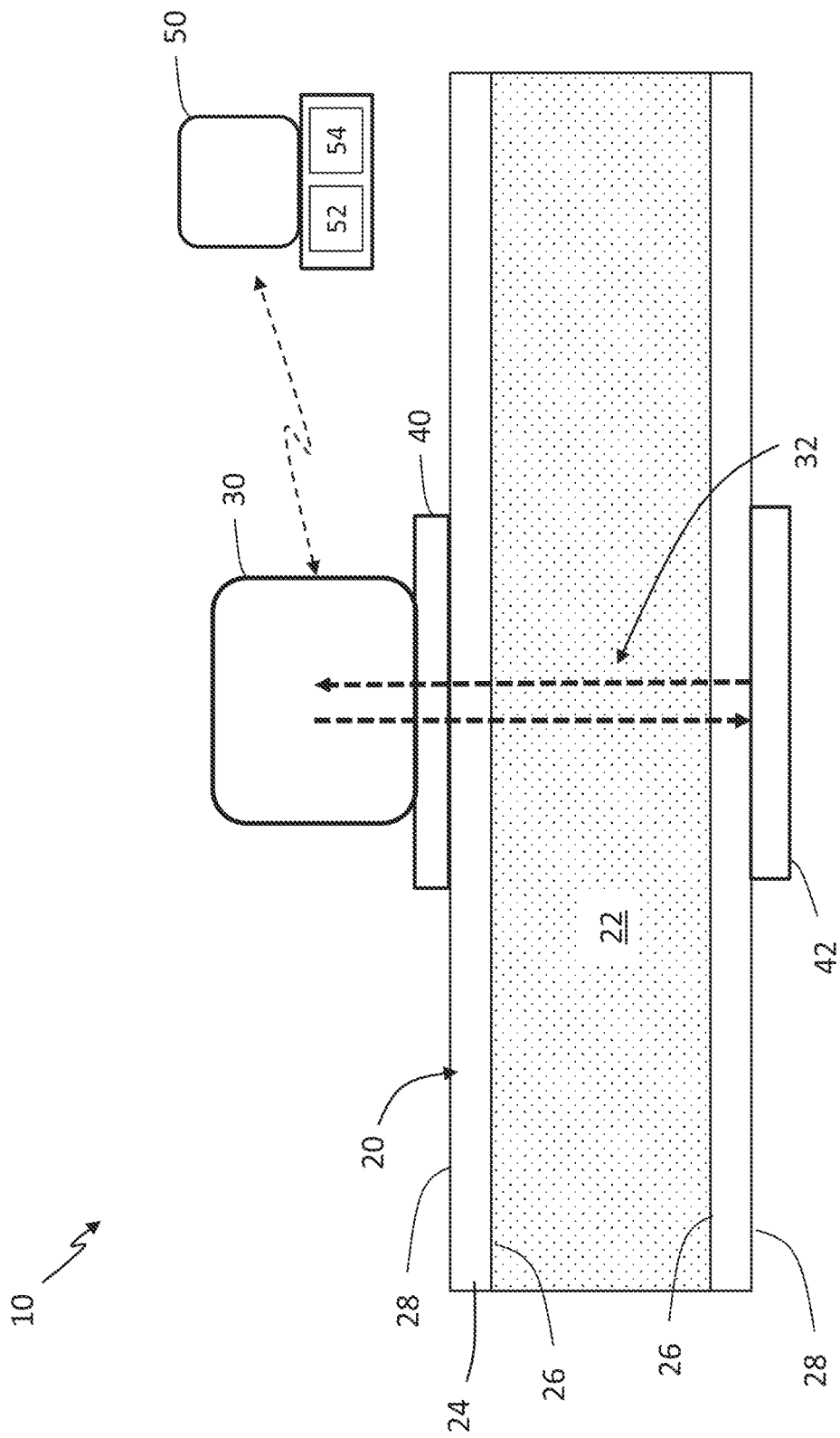
FIG. 2 is a diagrammatical illustration of a system for non-intrusive material identification, in accordance with exemplary embodiments of the present disclosure.

In FIG. 2, which is a diagrammatical illustration of a system for non-intrusive material identification, in accordance with exemplary embodiments of the present disclosure, a second couplant 42 is used on an opposing sidewall 24 from the emitting transducer 30. This second couplant 42 may be used as a reflection layer to the signals 32 transmitted from the acoustic transducer 30, and may act to improve signal reflection, i.e., transmission of that signal through the opposing portion of the sidewall 24 of the vessel 20 and reflected back to the acoustic transducer 30. It is noted that the in FIG. 2, the signal 32 may reflect off of the second nanotube couplant 42, whereas in the example of FIG. 1, the signal 32 reflects off the inner surface 26 of the sidewall 24 of the vessel 20.

Figure 3:
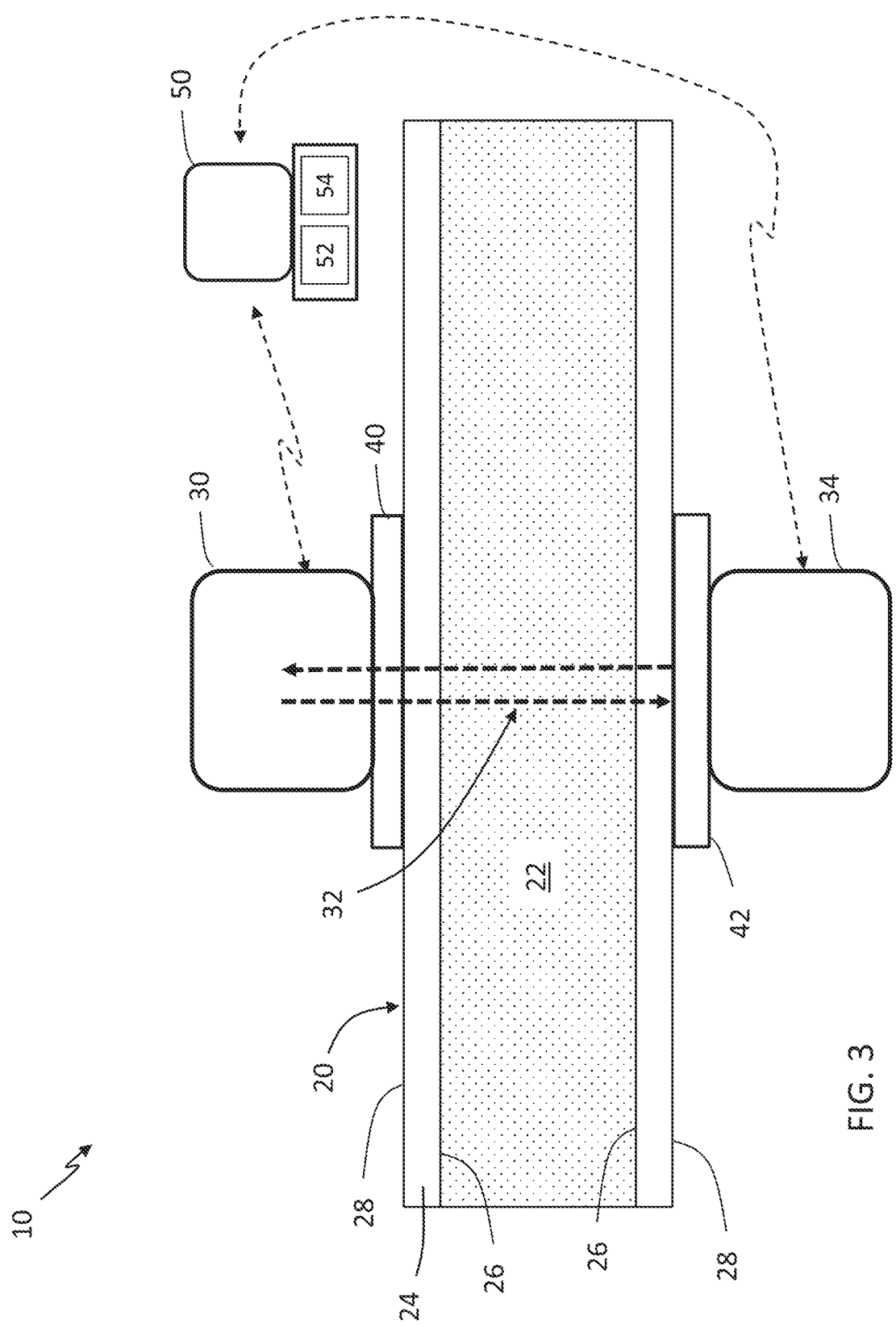
FIG. 3 is a diagrammatical view illustration of the system for non-intrusive material identification, in accordance with exemplary embodiments of the present disclosure.

In another example, FIG. 3 is a diagrammatical view illustration of the system for non-intrusive material identification, in accordance with exemplary embodiments of the present disclosure, where a second nanotube couplant 42 and a second acoustic transducer 34 are both used. This configuration allows for improved pitch-catch signal transmission, where signal 32 is emitted from the first transducer 30 and is received by the second transducer 34 to achieve a pulse-echo configuration. Here, each of the first and second nanotube couplants 40, 42 help prevent energy loss of the signal 32 when transmitted through the sidewall 24 of the vessel 20. The signal 32 may be able to reflect off of the opposing nanotube couplant 42, as shown, or they may be configured to reflect off of the inner surface 26 of the sidewall 24 of the vessel 20.

Other configurations for using one or more nanotube couplants 40 with one or more acoustic transducers 30 are also contemplated, all of which are considered within the scope of the present disclosure.

Recent advances in nanotechnology have yielded a number of new materials with nanofibers and nano-pores that can be implemented in acoustic applications. Despite isolated measurements of the acoustic absorption properties of nano materials having not been studied widely, it has been discovered that applications of the acoustic properties presented from carbon nanotubes (CNT), or multi-walled carbon nanotubes (MWCNT) arrays may provide benefits with designing effective acoustic transducers and coupling layers which may make use of various arrangements and compositions of nanotube arrays, including carbon, non-carbon or composite. Thus, the use of nanotube couplants 40 in any configuration can provide substantial improvements in preventing signal energy loss, in allowing a wide frequency range of signals to be used, and in withstanding substantial heat and low chemical reactivity for applications in harsh environments, among other benefits.

Using carbon nanotubes as an exemplary material, it is noted that the strength and flexibility of carbon nanotubes make them of potential use in controlling other nanoscale structures, which suggests they will have a significant role in nanotechnology engineering. Most of the physical properties of carbon nanotubes derive from graphene. In graphene, carbon atoms are densely organized in a regular $sp^2$-bonded atomic-scale honeycomb (hexagonal) pattern, and this pattern is a basic structure for other $sp^2$ carbon bonded materials (allotropes) such as fullerenes and carbon nanotubes. Carbon nanotubes are theoretically distinct as a cylinder fabricated of rolled up grapheme sheet. It can be divided into a single well or multiple wells.

Figure 4B:
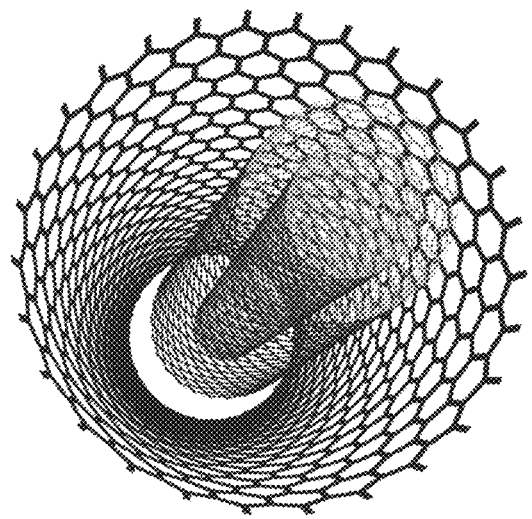
FIG. 4B is a diagrammatical view illustration of a multi-walled carbon nanotube used with the system for non-intrusive material identification, in accordance with exemplary embodiments of the present disclosure.
Figure 4A:
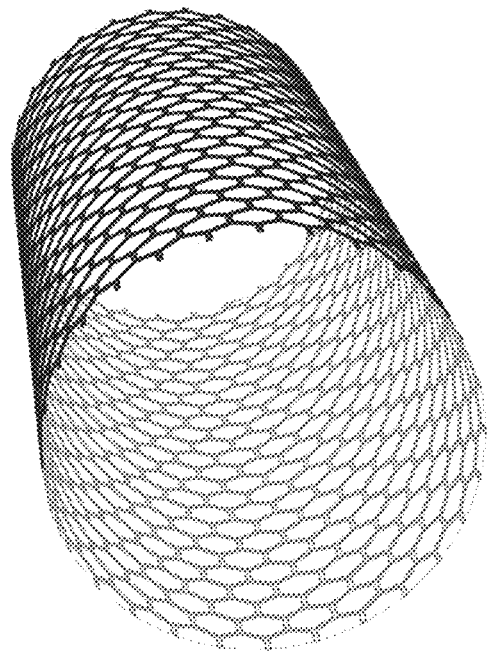
FIG. 4A is a diagrammatical view illustration of a single-walled carbon nanotube used with the system for non-intrusive material identification, in accordance with exemplary embodiments of the present disclosure.

Nanotubes with a single well are described as single-wall carbon nanotubes (SWCNTs), while the ones with more than one well are MWCNTs. FIG. 4A is a diagrammatical view illustration of a single-walled carbon nanotube used with the system for non-intrusive material identification, in accordance with exemplary embodiments of the present disclosure, whereas FIG. 4B is a diagrammatical view illustration of a multi-walled carbon nanotube used with the system for non-intrusive material identification, in accordance with exemplary embodiments of the present disclosure. Carbon can bond in different ways to construct structures with completely different properties. This will enable transducers to bond to materials without an additional coupling.

As shown in FIG. 4B, MWCNTs are multiple concentric nanotubes precisely nested within one another. One potential example of these are MWCNT that can be aligned in a direction and implemented in an array. The MWCNTs are just connected with van der Waals forces, and no binder material is needed. These show a striking telescoping property whereby an inner nanotube core may slide, almost without friction, within its outer nanotube shell, thus creating an atomically perfect linear or rotational motion that shows nearly no friction.

Both SWCNTs as well as MWCNTs may be used within the nanotube couplant 40 of FIGS. 1-3. MWCNTs may be used with substantial benefits as a couplant or as components of acoustic sensor design for providing non-intrusive or non-destructive material properties analysis, including material identification or assessment of fluids within vessels 20, or with other forms of material analysis using ultrasonic testing. The system 10, as described herein may utilize emerging molecular nanotechnology where precise positioning of atoms is applied to create improvements in acoustic sensing, including material identification applications with wide frequency range and less energy loss and capable of withstanding substantial heat and low chemical reactivity for applications in harsh environments.

In chemistry, reactivity is a huge impetus for material identification applications where chemical substances undergo chemical reactions. This is usually coupled with an overall release of significant energy leading to extreme temperatures in the reactor itself or the walls of the container encapsulating the reactor. For instance, the extraordinary thermal and elastic properties of graphene, mainly originating from its unique acoustic phonon branches near Γ point in Brillouin zone, have attracted great attention in its fundamental research and practical applications. The CNT's have high anisotropic transport properties, including electrical conductivity and thermal conductivity. Crystal quality of CNT has been confirmed by Raman scattering measurement. Intensity ratio of G-peak (1580 cm-1) and D-peak (1350 cm-1) represents quality of graphitization of carbon materials. G/D of CNT is ~3, showing high crystal quality. The high crystallinity may also be supported by transmission electron microscopy.

With the use of nanotube couplants 40, acoustic signal transmission through walls of vessels 20 or other containment units can be improved, which can increase the accuracy of material type identification in the fluid within the vessel, where the signals 32 are used, at least in part, to make a determination of a material identification of the quantity of fluid using known techniques. It is noted that the nanotube material forming the couplant, in whole or part, may include various characteristics or designs. For instance, it may be possible to apply single or multiwalled nanotubes of any material as a coupling layer between the acoustic transducer 30 and the material which is desired to be analyzed or investigated, such as by applying a layer of carbon nanotubes on the outside of the vessel 20 or pipe to improve reflection of the ultrasound wave in multiple conditions. A standard transducer may be used with one or more nanotube coupling layers to improve existing transducers, thereby allowing existing transducer technology to operate better than it conventionally does. It may also be possible to apply one or more coupling layers, which may allow for future applications, such as a gigahertz mechanical oscillator where there are no losses in the transducer. It is also possible to use vertically aligned nanotube arrays to improve existing mechanical properties of the transducers, including with the speed of sound, impedance, and attenuation.

Tables 1 and 2, below, illustrate supporting data to the improvement of impedance by using nanotubes in couplants relative to various other materials:

TABLE 1

| CNT | | | | | | Impedance |
|---|---|---|---|---|---|---|
| density | d | 1.3 | g/cm^3 | 13 | kg/m^3 | |
| speed | s | 12000 | m/s | 12000 | m/s | |
| Impedance | d*s | | | | | 156,000.00 kg/s · m^2 |
| CNT reference Impedance | | | | | | |
| density | d | 1.3 | g/cm^3 | 6500.00 | kg/m^3 | |
| speed | s | 12000 | m/s | 12000.00 | m/s | |
| density | d | 1.3 | g/cm^3 | 866.67 | kg/m^3 | |
| speed | s | 90000 | m/s | 90000 | m/s | |
| Impedance | d*s | | | | | 78,000,000.00 kg/s · m^2 |
| CNT | | | | | | |
| density | d | 1.3 | g/cm^3 | 13 | kg/m^3 | |
| speed | s | 90000 | m/s | 90000 | m/s | |
| Impedance | d*s | | | | | 1,170,000.00 kg/s · m^2 |
| Steel Longitudinal | | | m/s | | | |
| density | | | | 7980 | kg/m^3 | |
| speed | | | | 5900 | m/s | |
| Impedance | | | | | | 47,082,000.00 kg/s · m^2 |
| Sheer | | | | | | |
| density | | | | 7980 | kg/m^3 | |
| speed | | | | 3600 | m/s | |
| Impedance | | | | | | 28,728,000.00 kg/s · m^2 |

TABLE 1-continued

PZT Ceramic

| | | | | | | | |
|---|---|---|---|---|---|---|---|
| density | d | 750 | g/cm^3 | 7500 | kg/m^3 | | |
| speed | s | 3800 | m/s | 3800 | m/s | | |
| Impedance | d*s | | | | | 28,500,000.00 | kg/s · m^2 |

Quartz

| | | | | | | | |
|---|---|---|---|---|---|---|---|
| density | d | 750 | g/cm^3 | 2600 | kg/m^3 | | |
| speed | s | 5700 | m/s | 5700 | m/s | | |
| Impedance | d*s | | | | | 14,820,000.00 | kg/s · m^2 |

Glycerin

| | | | | | | | |
|---|---|---|---|---|---|---|---|
| density | d | 1.26 | g/cm^3 | 1260 | kg/m^3 | | |
| speed | s | 1904 | m/s | 1904 | m/s | | |
| Impedance | d*s | | | | | 2,399,040.00 | kg/s · m^2 |

Echo Z

| | | | | | | | |
|---|---|---|---|---|---|---|---|
| density | d | 1.4 | g/cm^3 | 1400 | kg/m^3 | | |
| speed | s | 2600 | m/s | 2600 | m/s | | |
| Impedance | d*s | | | | | 3,640,000.00 | kg/s · m^2 |
| Aluminum | d | | g/cm^3 | | kg/m^3 | | kg/s · m^2 |
| | s | | m/s | | m/s | | |
| | d*s | | | | | | |
| Glass | d | | g/cm^3 | | kg/m^3 | | kg/s · m^2 |
| | s | | m/s | | m/s | | |
| | d*s | | | | | | |

Polymer

| | | | | | | | |
|---|---|---|---|---|---|---|---|
| density | d | 180 | g/cm^3 | 1800 | kg/m^3 | | |
| speed | s | 2200 | m/s | 2200 | m/s | | |
| Impedance | d*s | | | | | 3,960,000.00 | kg/s · m^2 |

Sonotech: Ultra gel II

| | | | | | | | |
|---|---|---|---|---|---|---|---|
| | d | | g/cm^3 | 1090.909 | kg/s · m^2 | | |
| | s | 1650 | m/s | 1650 | | | |
| | d*s | | | | | 1,800,000.00 | kg/s · m^2 |

Water

| | | | | | | | |
|---|---|---|---|---|---|---|---|
| density | d | 1 | g/cm^3 | 1000 | kg/m^3 | | |
| speed | s | 1480 | m/s | 1480 | m/s | | |
| Impedance | d*s | | | | | 1,480,000.00 | kg/s · m^2 |

Air

| | | | | | | | |
|---|---|---|---|---|---|---|---|
| density | d | 0.001204 | g/cm^3 | 1.2041 | kg/m^3 | | |
| speed | s | 343.21 | m/s | 343.21 | m/s | | |
| Impedance | d*s | | | | | 413.26 | kg/s · m^2 |

Methane

| | | | | | | | |
|---|---|---|---|---|---|---|---|
| density | d | 0.00108 | g/cm^3 | 1.08 | kg/m^3 | | |
| speed | s | 415 | m/s | 415 | m/s | | |
| Impedance | d*s | | | | | 448.20 | kg/s · m^2 |

PZT

| | | | | | | | |
|---|---|---|---|---|---|---|---|
| density | d | 0.00108 | g/cm^3 | 1.08 | kg/m^3 | | |
| speed | s | 415 | m/s | 415 | m/s | | |
| Impedance | d*s | | | | | 448.20 | kg/s · m^2 |

TABLE 2

| Z1 | Z2 | Optimal Impedance | Optimal Layer Thickness | Reflection $((Z2 - Z1)/(Z2 + Z1))^2$ | Transmission $4*z2*z1/(z2 + z1)^2$ | Transmission [%] |
|---|---|---|---|---|---|---|
| Steel/Sheer 28.73 | PZT Ceramic 28.50 | 28.61 | | −0.23 0.0015872764% | 57.23 99.9984127236% | 99.99841272% |
| PZT Ceramic 28.50 | Ultragel II 1.80 | | | −26.70 77.6492500735% | 30.30 22.3507499265% | 22.35074993% |
| Ultragel II 1.80 | Steel/Sheer 28.73 | 28.61 | | 77.8057137771% | 22.1942862229% | 4.96058941% |
| Quartz 14.82 | PZT Ceramic 28.5 | | | 9.9722991690% | 90.0277008310% | 90.02770083% |
| PZT Ceramic | Ultragel II | | | | | |

TABLE 2-continued

| Z1 | Z2 | Optimal Impedance | Optimal Layer Thickness | | | Reflection ((Z2 − Z1)/(Z2 + Z1))^2 | Transmission 4*z2*z1/(z2 + z1)^2 | Transmission [%] |
|---|---|---|---|---|---|---|---|---|
| 28.50 Ultragel II | 1.80 Steel/Sheer | 28.61 | | | | 77.6492500735% | 22.3507499265% | 20.12186628% |
| 1.80 softer than CNT | 28.73 | Steps | | | | 77.8057137771% | 22.1942862229% | 4.46590459% |
| | | 1 | PZT Ceramic 28.50 | Ultragel II 1.80 | Optimal | Reflection 77.65% | Transmission 22.35% | Transmission 22.35% |
| | | 2 | Ultragel II 1.80 | Steel/Long 47.08 | 36.63 | 85.81% | 14.19% | 3.17% |
| Stainless Sheer 28.73 | Air 0.000448200000 | | | | | Reflection 99.9937595932% | Transmission 0.0062404068% | Transmission 0.00624041% |
| Air 0.000413259 | Stainless Steel 28.728 | | | | | 99.9942460697% | 0.0057539303% | 0.00575393% |
| Stainless Long 47.08 | CNT 78.00 | | | | | 6.1098866330% | 93.8901133670% | 93.89011337% |
| CNT 78.00 | Air 0.000413259161 | | | | | 99.9978807447% | 0.0021192553% | 0.00198977% |
| | | Steps 1 | PZT Ceramic 28.50 | CNT 78.00 | Optimal | Reflection 21.60% | Transmission 78.40% | Transmission 78.40% |
| | | 2 | CNT 78.00 | Stainless Long 47.082 | 36.63 | 6.11% | 93.89% | 73.61% |

Tables 3 and 4 illustrate practical examples of the benefit of the system 10. In particular, Table 3 illustrates traditional transducer using (PZT Ceramic) and couplant (Ultragel II) to interface with steel wall:

TABLE 3

| Steps | Material/ Impedance | Material/ Impedance | Optimal | Signal after Reflection | Signal after Transmission | Signal in the Container |
|---|---|---|---|---|---|---|
| 1 | PZT Ceramic 28.50 | Ultragel II 1.80 | Impedance 36.63 | 77.65% | 22.35% | |
| 2 | Ultragel II 1.80 | Steel/Long 47.08 | | 85.81% | 14.19% | 3.17% |

This table shows that traditional transducers loose potentially ~90%+ of the initial signal in the transducer only, and there is evidence that 80% of these losses are centered in the conversion of electric to mechanical energy.

Table 4 illustrates data in an example where a transducer using (PZT Ceramic) and a nano base couplant (CNT) to interface with the wall is used:

TABLE 4

| Steps | Material/ Impedance | Material/ Impedance | Optimal | Signal after Reflection | Signal after Transmission | Signal in the Container |
|---|---|---|---|---|---|---|
| 1 | PZT Ceramic 28.50 | CNT 78.00 | Impedance 36.63 | 21.60% | 78.40% | 78.40% |
| 2 | CNT 78.00 | Stainless Long 47.082 | | 6.11% | 93.89% | 73.61% |

Here, the nanotubes material is using "standard" maximum impedance, however it is possible to find appropriate design and material composition to achieve the target impedance for this case of 36.63 and therefore 100% signal transmission. For Tables 3-4, all impedance values are in MRayls units.

Figure 5:
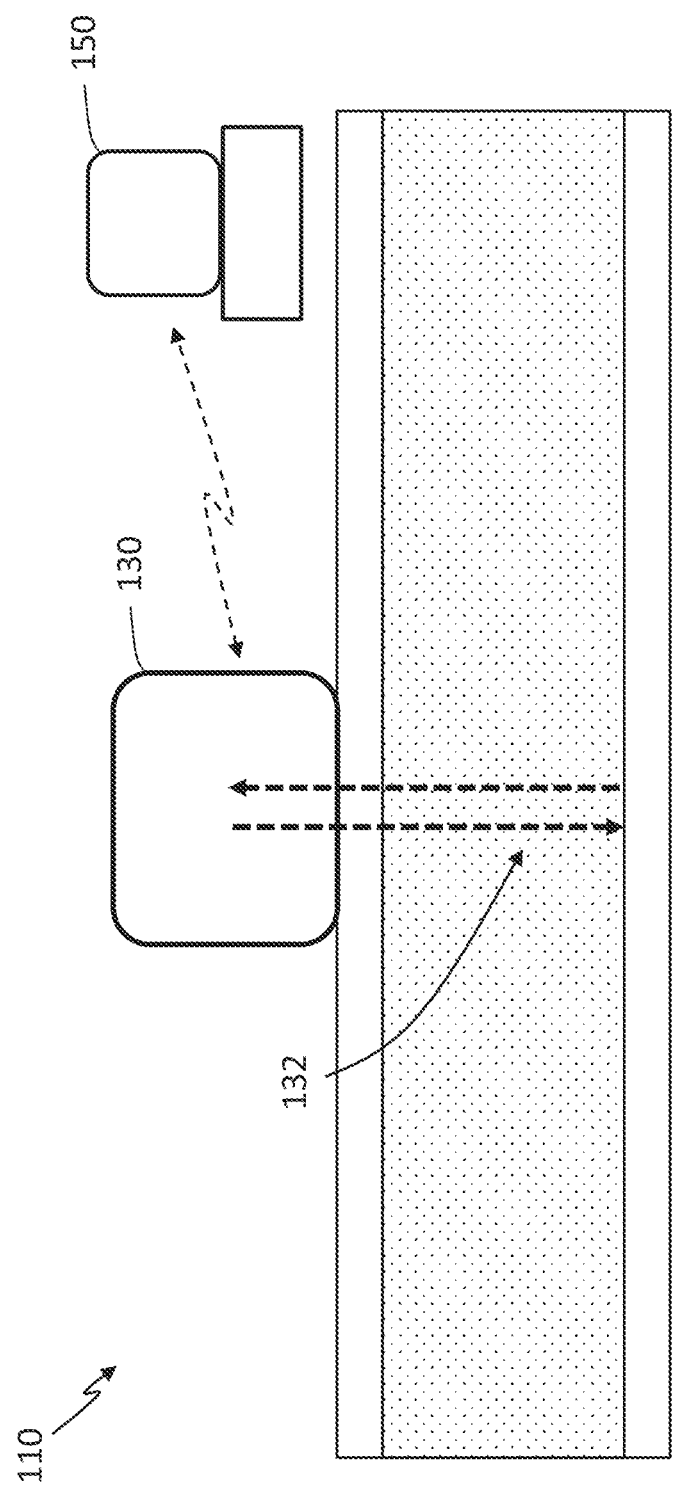
FIG. 5 is a diagrammatical view illustration of the system for non-intrusive material identification without a couplant, in accordance with exemplary embodiments of the present disclosure.

FIG. 5 is a diagrammatical view illustration of a system for non-intrusive material identification without a couplant 110, in accordance with exemplary embodiments of the present disclosure. In particular, the system 110 depicts the use of a pulse-echo scenario of nanotubes-based transducer 130 that would not require additional interface layer. The nano technology based transducer 130 may not need the couplant, as described relative to FIGS. 1-4, since the impedance can be adjusted for the signal 132 to be transmitted and/or received to achieve the desired results, which can be communicated to the computerized device 150 for material identification. The system 110 of FIG. 5 using pulse-echo may require only one nano enabled transducer 130. The benefits of the nano technology in this transducer 130 can be used once for the full cross pipe roundtrip. This may allow for applications that can be served by just minimum improvements of the signal strength.

Figure 6:
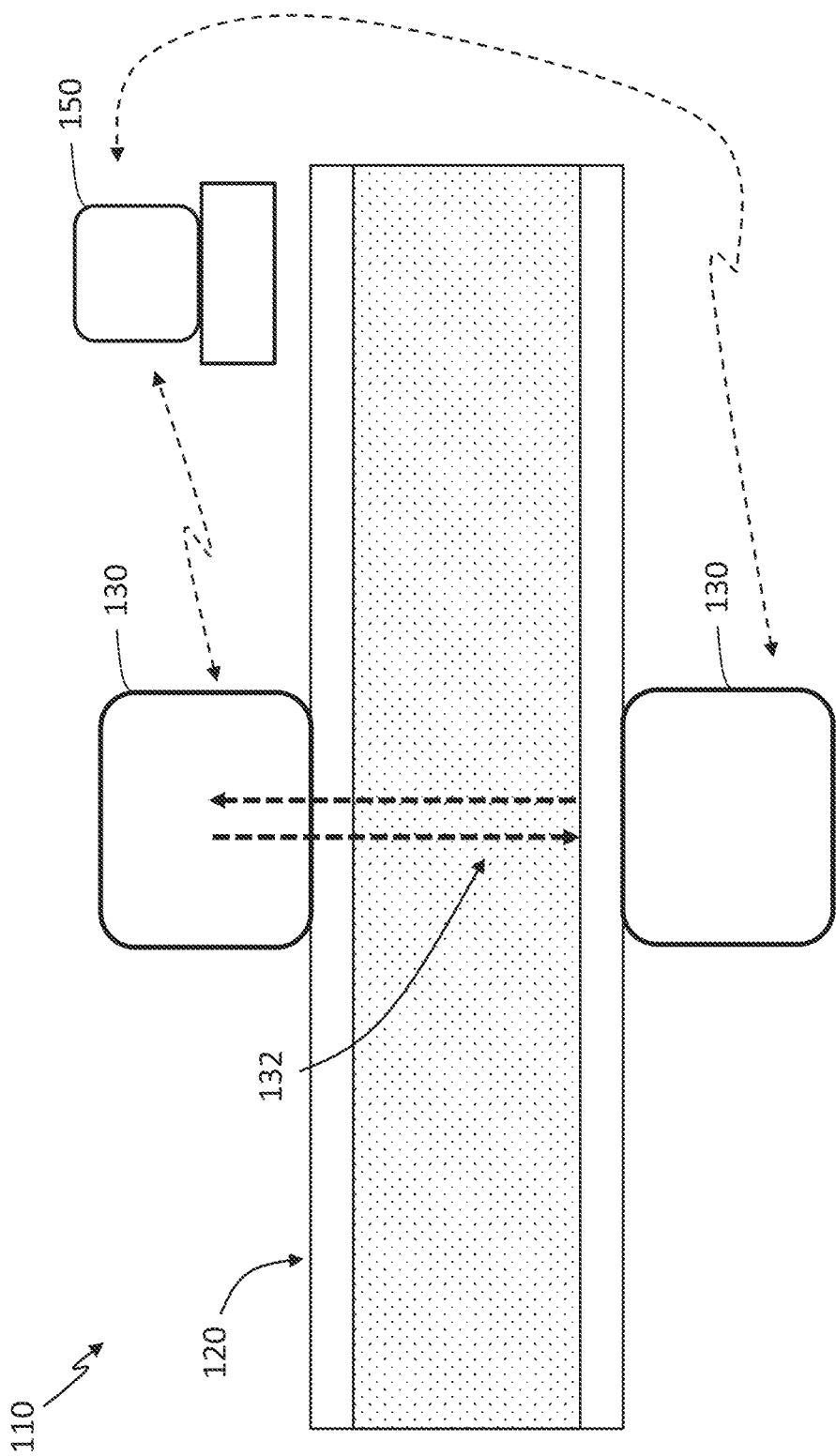
FIG. 6 is a diagrammatical view illustration of a system for non-intrusive material identification without a couplant, in accordance with exemplary embodiments of the present disclosure.

FIG. 6 is a diagrammatical view illustration of a system for non-intrusive material identification without a couplant 110, in accordance with exemplary embodiments of the present disclosure. In this situation, it may be possible use a setup that includes two transducers 130, however only one is sending the signal 132 and both transducers 130 are recording the echoes. This may make it possible to use the pulse-echo and pitch-catch echoes techniques at the same time. This may provide the opportunity to sense how the echoes decay in time where the signal 132 is crossing the pipe 120 only once. In pitch-catch, two nano-based transducers may derive significant signal improvement benefit i.e. the signal will be with a higher signal to noise ratio and twice more frequent measurements since it may be possible to use both transducers for measurements.

In both FIGS. 5-6, the nanotube couplant of FIGS. 1-3 may not be needed because the nanotube technology is incorporated into the sensing portion of the transducer(s) 130 itself, such that the nanotubes can be used as part of the sensor. When the nanotubes are used as part of the sensor, even the smallest signal can be transferred to the nanotube sensor which can register that signal. This is especially true for multi-walled nanotubes, since the nanotubes are nested in other tubes, the inner tubes will move or raise up when any signal is received. This creates a vibration medium that does not create friction, such that even the slightest signals can be detected.

It is also noted that a nanotube couplant can be used with FIGS. 5-6 to further enhance the coupling to the vessel, where the nanotube couplants can be used to fill uneven surfaces within the surfaces of the vessel.

Figure 7:
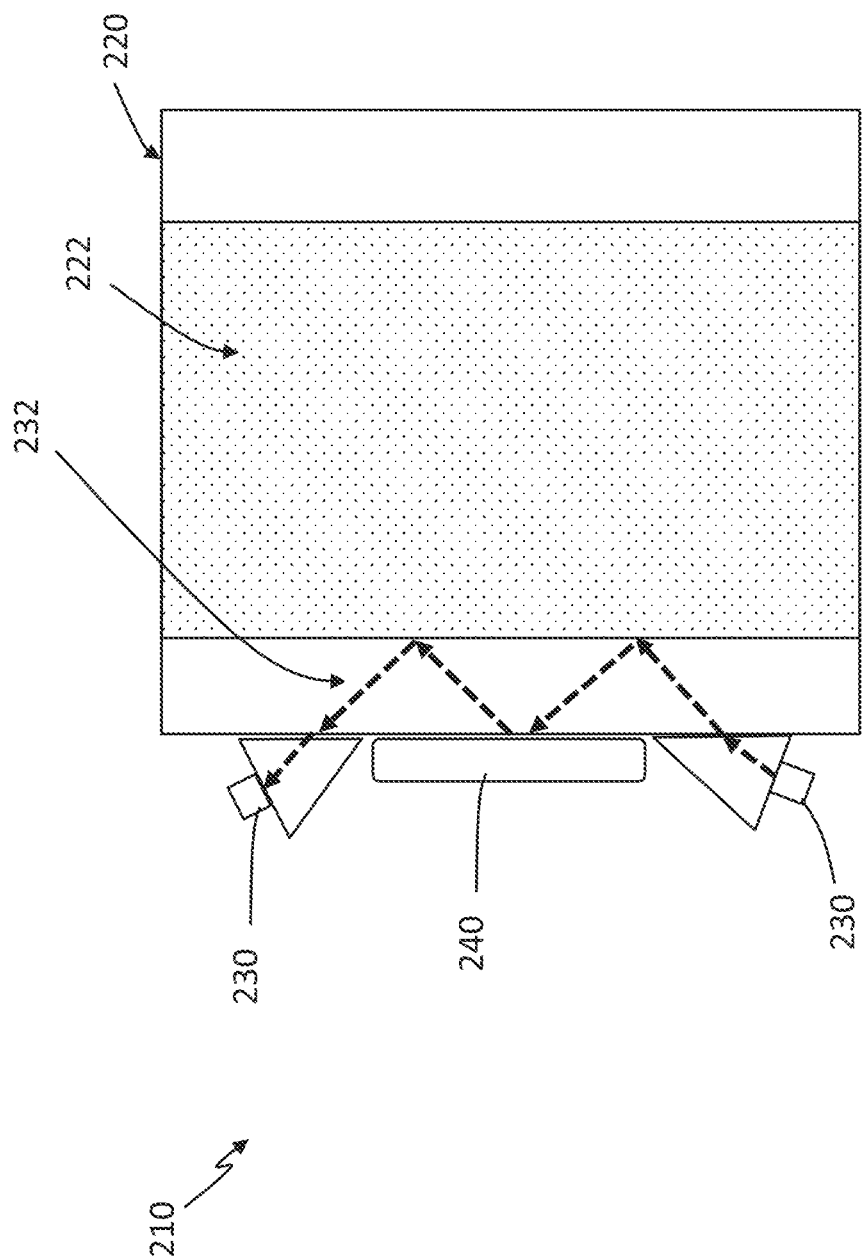
FIG. 7 is a diagrammatical view illustration of a system for non-intrusive material identification, in accordance with exemplary embodiments of the present disclosure.

FIG. 7 is a diagrammatical view illustration of a system for non-intrusive material identification 210, in accordance with exemplary embodiments of the present disclosure. As shown in FIG. 7, nano technology may be used for assisted signal 232 transmission from transducers 230 within the pipe or vessel wall 220 bouncing for enhanced material detection, even with a material 222 or fluid within the pipe. Multiple bounces within the wall 220 may facilitate multiple interaction with the material 222 however the interaction with the air is an unknown variable to an extent since the exact air composition is not known. As shown in FIG. 7, the outside air contact is effectively replaced with one or more nano technologies enabled layers 240 which has known impedance, which is positioned between the transducers 230 on the exterior sidewall of the vessel wall 220. An acoustic signal 232 emitted from one or both of the transducers 230 may reflect between the inner and outer surfaces of the sidewall 220 and the nano technologies enabled layers 240. In this arrangement, it may be possible to predict the material inside the container better since the impedance of the nano technologies enabled layers 240 is known, whereas the ambient air or atmosphere may not be known.

Figure 8A:
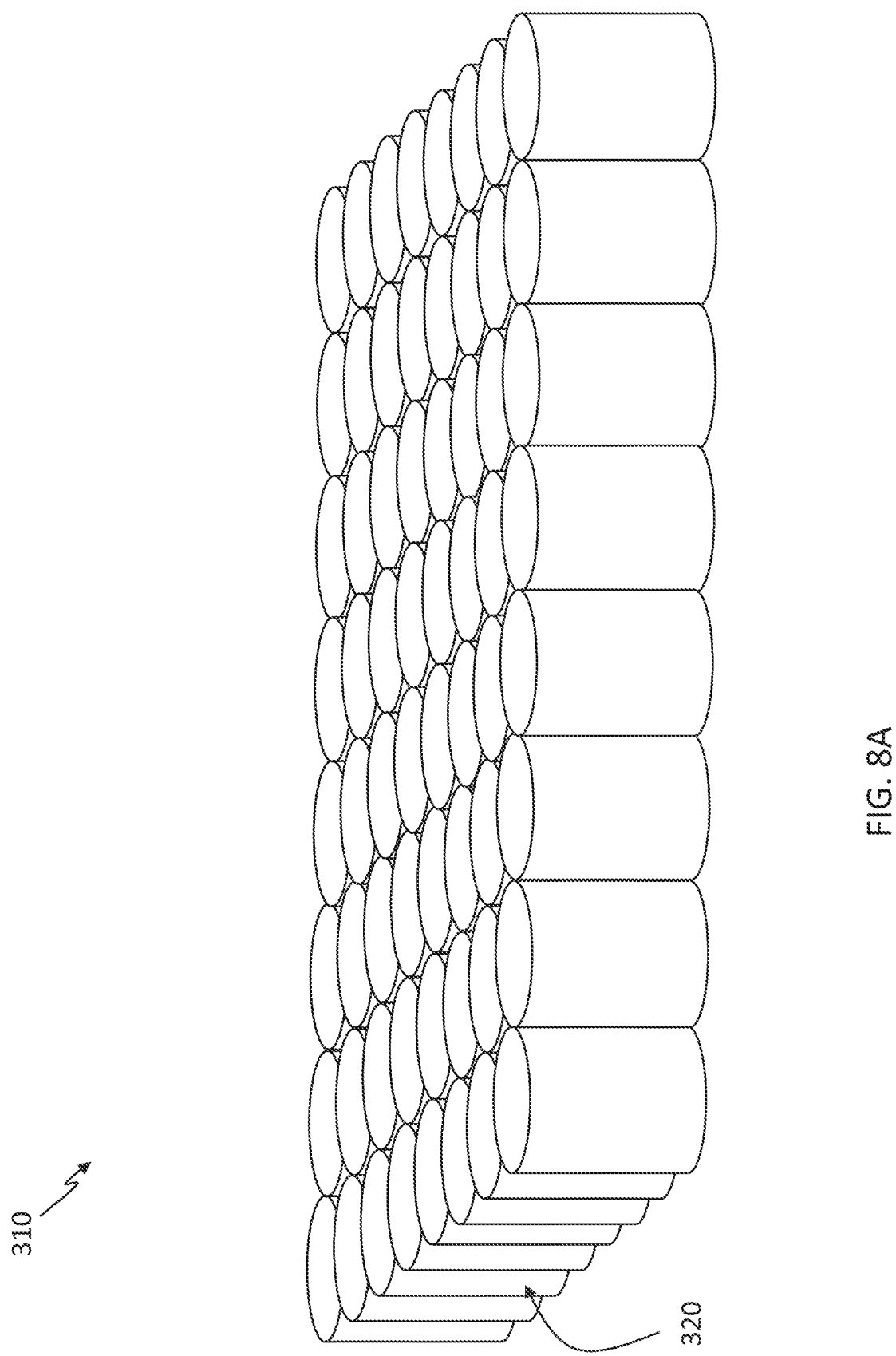
FIG. 8A is a diagrammatical view illustration of a system for non-intrusive material identification, in accordance with exemplary embodiments of the present disclosure.

FIG. 8A is a diagrammatical view illustration of a system for non-intrusive material identification 310, in accordance with exemplary embodiments of the present disclosure. As shown, FIG. 8A depicts a couplant layer design with oriented array of single- or multiwalled-nanotubes 320 either filled with air or other materials to additionally change the impedance. The nanotubes 320 may form a vertically aligned nanotube array with each nanotube positioned substantially axially parallel to the other nanotubes, or an array aligned in a different orientation. This nanotube oriented array couplant design may provide improved signal transmission and noise range filtering/selection as well as high-temperature applications, low signal losses and wide frequency range of signal transmission enabling for better detection of materials inside the pipe/container. The nano materials can vary widely that would lead to implementation of wide range of impedance for single or multiple layer matching for signal improvement.

Figure 8B:
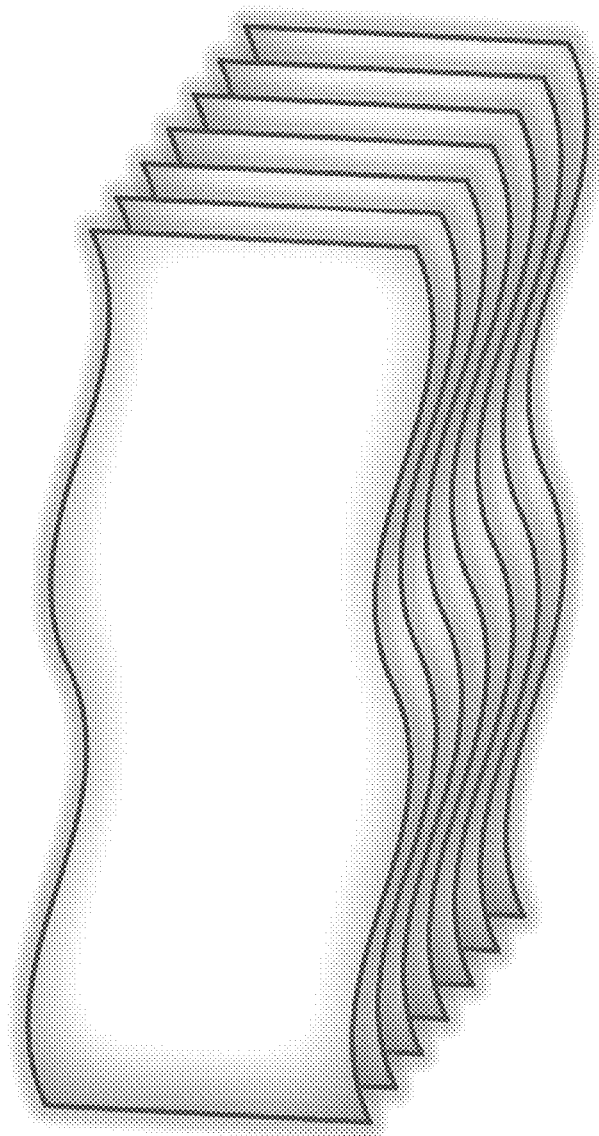
FIG. 8B is a diagrammatical view illustration of a system for non-intrusive material identification, in accordance with exemplary embodiments of the present disclosure.

FIG. 8B is a diagrammatical view illustration of a system for non-intrusive material identification 310, in accordance with exemplary embodiments of the present disclosure. As shown, FIG. 8B illustrates graphene-like sheets with a nearly two-dimensional shape which can be oriented perpendicular or horizontal in relation to the surface of the wall of the container. The graphene-like sheets may be positioned substantially parallel to one another along a planar orientation of the sheets. These multiple nanotube graphene-like sheets couplant designs may provide improved signal transmission and noise range filtering/selection as well as high-temperature applications, low signal losses and wide frequency range of signal transmission enabling for better detection of materials inside the pipe/container. The nano materials can vary widely that would lead to implementation of wide range of impedance for single or multiple layer matching for signal improvement.

Figure 9A:
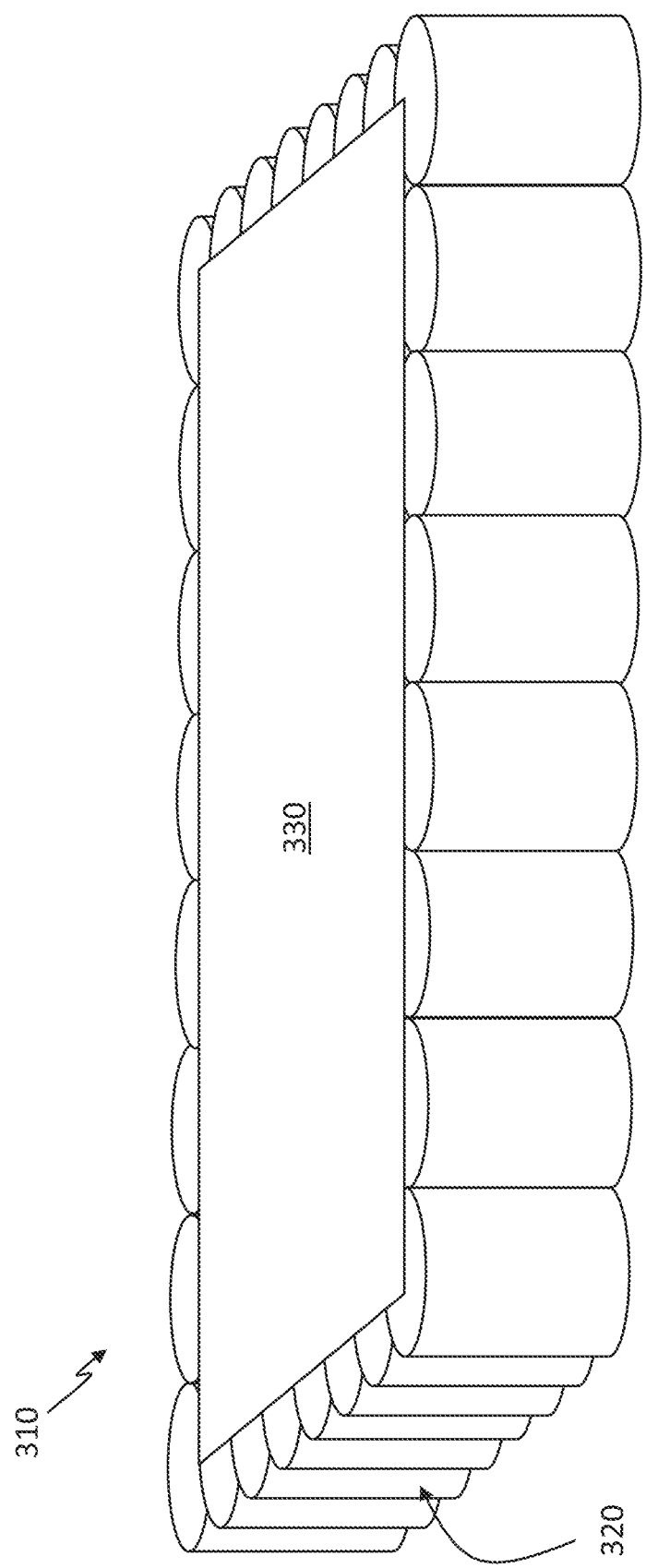
FIG. 9A is a diagrammatical view illustration of a system for non-intrusive material identification, in accordance with exemplary embodiments of the present disclosure.

In a similar design, FIG. 9A is a diagrammatical view illustration of a system for non-intrusive material identification 310, in accordance with exemplary embodiments of the present disclosure, which illustrates a transducer 320 transmitting signal nano technology enabled signals, electrically or mechanically induced signals. In particular, FIG. 9A depicts electrical or mechanical stimulation of ultrasound waves into oriented array of single- or multiwalled-nanotubes, where electrical or mechanical wave stimulating surface 330 or mechanism is placed on the top of the nanotubes layer. This nanotube oriented array couplant design may provide improved signal transmission and noise range filtering/selection as well as high-temperature applications, low signal losses and wide frequency range of signal transmission enabling for better detection of materials inside the pipe/container. The nano materials can vary widely that would lead to implementation of wide range of impedance for single or multiple layer matching for signal improvement.

Figure 9B:
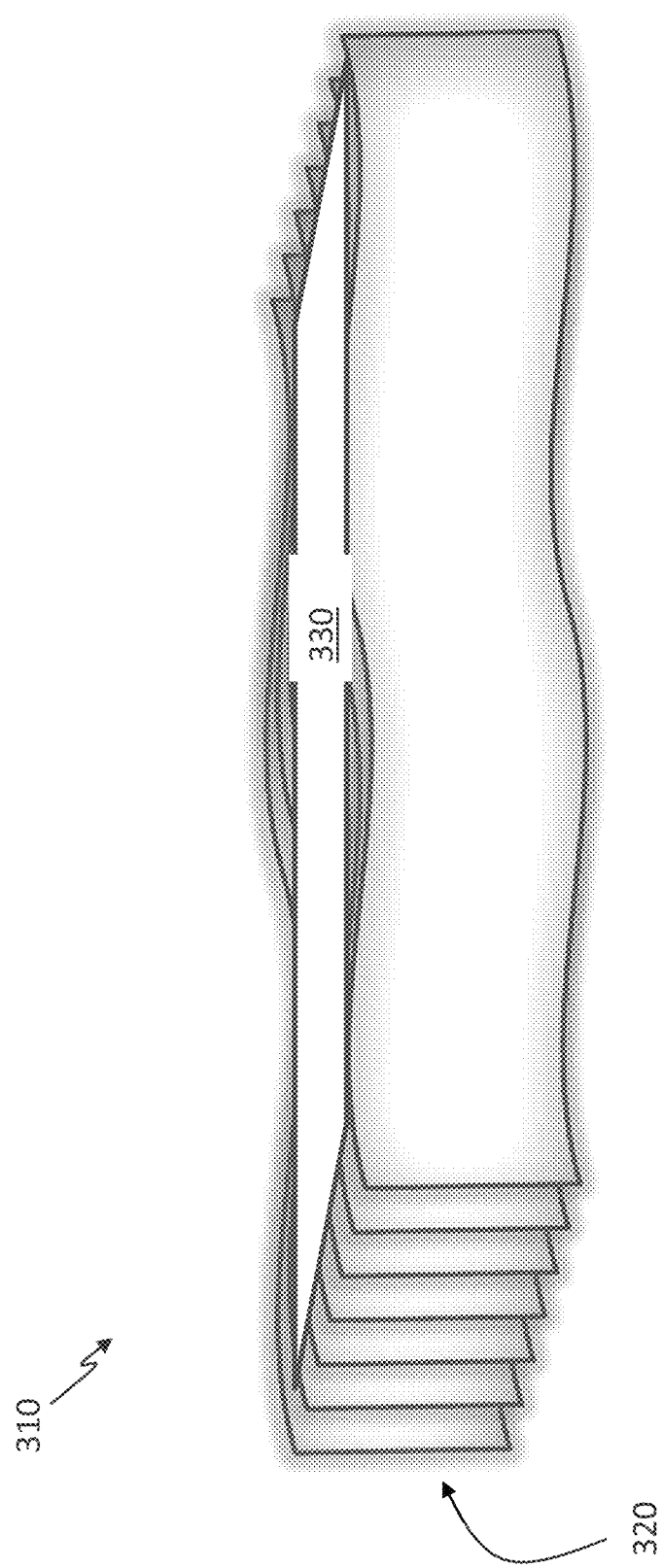
FIG. 9B is a diagrammatical view illustration of a system for non-intrusive material identification, in accordance with exemplary embodiments of the present disclosure.

FIG. 9B is a diagrammatical view illustration of a system for non-intrusive material identification 310, in accordance with exemplary embodiments of the present disclosure. As shown, FIG. 8B illustrates electrical or mechanical wave stimulating surface 330 which are laced on the top of the nano-tube layer, where the graphene like two dimensional sheets can be oriented perpendicular or horizontal in relation to the surface of the wall of the container. These multiple nanotube graphene like-sheets couplant designs may provide improved signal transmission and noise range filtering/selection as well as high-temperature applications, low signal losses and wide frequency range of signal transmission enabling for better detection of materials inside the pipe/container. The nano materials can vary widely that would lead to implementation of wide range of impedance for single or multiple layer matching for signal improvement.

Figure 10:
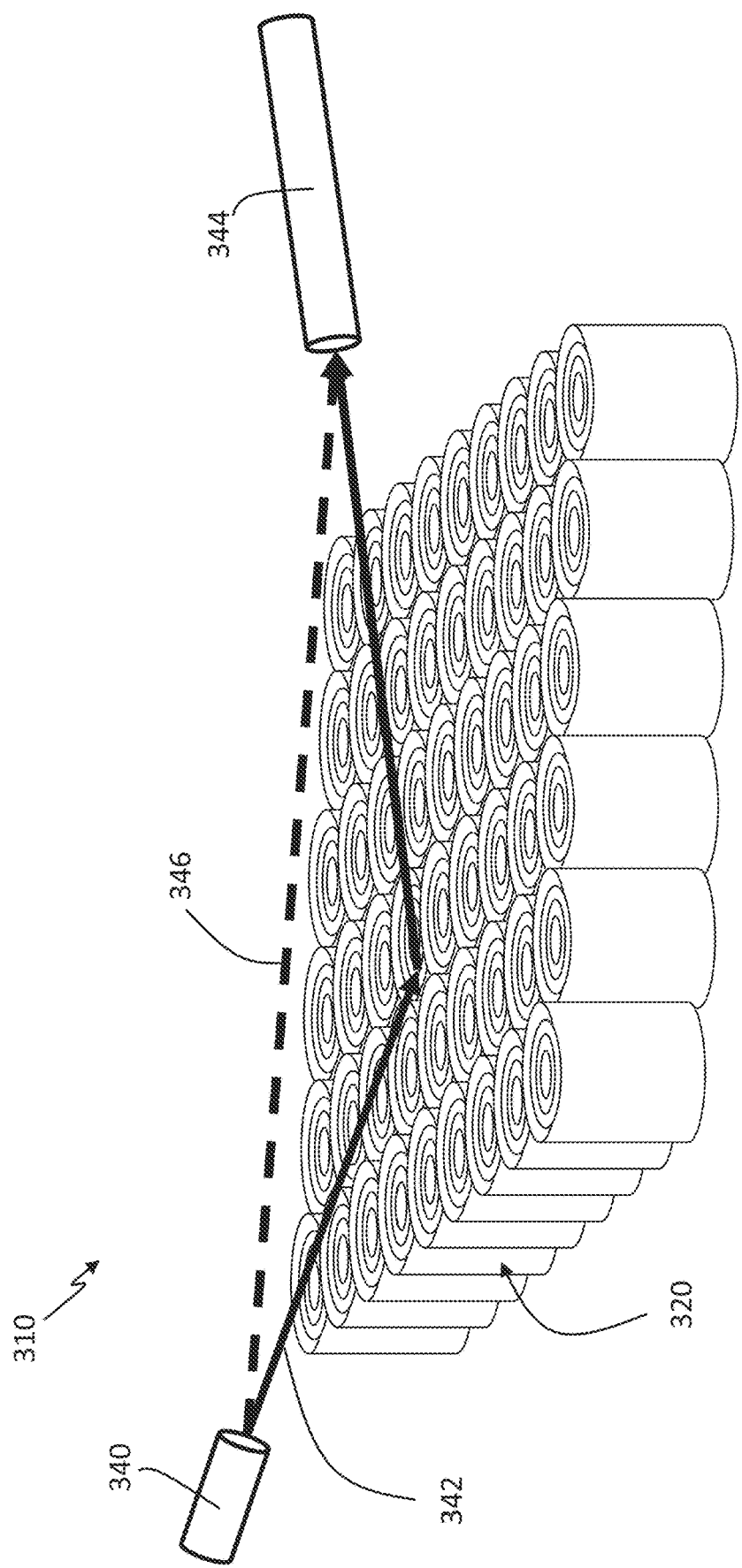
FIG. 10 illustrates a diagrammatical view illustration of a system for non-intrusive material identification, in accordance with exemplary embodiments of the present disclosure.

FIG. 10 illustrates a diagrammatical view illustration of a system for non-intrusive material identification 310, in accordance with exemplary embodiments of the present disclosure. In particular, FIG. 10 depicts how Multiwalled nanotubes can detect even the smallest signals since the innertubes are moving nearly without friction. As shown, a laser or optical sensor 340 is positioned to emit a signal 342 to a detector or optical sensor 344 which contacts the nanotube array 320. A second signal 346 may be used to determine a distance between the optical sensors 340, 344. The optical sensor 340 may emit the signal 342 as a laser sensing a coherent light beam to the surface of the nanotube array 320, while the signal 246 is for comparison of the optical sensors to determine motion remotely using reflected natural light, such as UV, visible, or IR light. The motion can be detected by sensor 344, which may be a laser interferometer, for instance. The pair of optical sensors can use this information to triangulate and determine the pattern of motions to be evaluated, thereby detecting even the smallest signals.

The use of the enhanced nanotube couplant or gel may provide significant benefits in the industry of acoustic signal transmission. Carbon nanotubes or sphere-enhanced couplant can be understood using the average impedance for a class of materials. As such, the only viable way to increase the energy of the signal is to reduce the impedance of the transducer by adding a modified carbon nanotube layer on the faces of the transducer with the desired impedance suitable for each application or class of applications. This is depicted in Tables 5-7:

TABLE 5

| Steps | | | | | | |
|---|---|---|---|---|---|---|
| 1 | PZT Ceramic | Nano Gel | Optimal | Reflection | Transmission | Transmission |
|   | 28.50 | 8.35 |   | 29.92% | 70.08% | 70.08% |
| 2 | CNT | PVC | 9.67 | 18.94% | 81.06% | 56.81% |
|   | 8.35 | 3.2844 |   |   |   |   |

TABLE 6

| Steps | | | | | | |
|---|---|---|---|---|---|---|
| 1 | PZT Ceramic | CNT | Optimal | Reflection | Transmission | Transmission |
|   | 28.50 | 8.35 |   | 29.92% | 70.08% | 70.08% |
| 2 | CNT | PE | 7.15 |   |   |   |
|   | 8.35 | 1.794 |   | 41.75% | 58.25% | 40.82% |

TABLE 7

| Steps | | | | | | |
|---|---|---|---|---|---|---|
| 1 | PZT Ceramic | CNT | Optimal | Reflection | Transmission | Transmission |
|   | 28.50 | 8.35 |   | 29.92% | 70.08% | 70.08% |
| 2 | CNT | PE | 8.21 |   |   |   |
|   | 8.35 | 2.3674 |   | 31.14% | 68.86% | 48.26% |

From Tables 5-7, it can be seen that the transducer impedance needs to be closer to the class of the material that has been identified. Thus, for air, it needs to be in the range of 600-800 Rayls, whereas for polymers, between 6-8 Mrayls, and for metals, approximately around 50 Mrayls.

In some situations, a pipe formed with a polymer pipe wall, such as polyethylene (PE) can lead to a 50% signal increase, as shown in Table 8:

TABLE 8

| Steps | PZT Ceramic | CNT/Grphn-1 | Optimal | Reflection | Transmission | Transmission |
|---|---|---|---|---|---|---|
|   | 28.50 | 16.80 |   | 6.67% | 93.33% | 93.33% |
| 1 | CNT/Grphn-1 | 16.5 | 16.24 |   |   |   |
|   | 16.80 | 9.25 |   | 8.40% | 91.60% | 85.49% |
| 2 | CNT/Grphn-2 | CNT/Grphn-3 | 8.20 |   |   |   |
|   | 9.25 | 4.00 |   |   | 84.30% | 72.07% |
| 3 | CNT/Grphn-3 | Stainless Long | 4.08 |   |   |   |
|   | 4.00 | 1.8 |   | 14.39% | 85.61% | 61.70% |

Exponentially reducing layers may help increase the energy that will cross into the material. It is noted that the optimization may advantageously be done top down, layer by layer. When the top layer impedance produces a maximum transmission, then it may be possible to move to the bottom layer.

Figure 11:
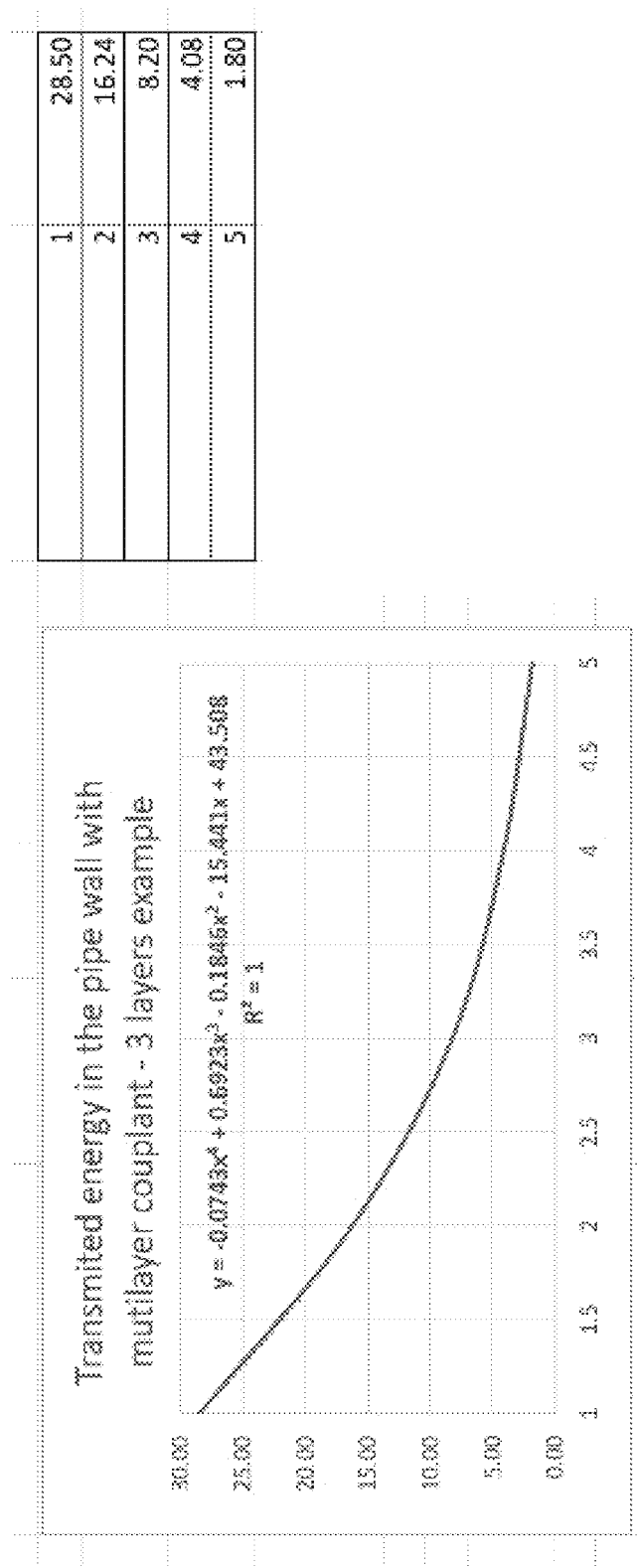
FIG. 11 illustrates an example of the subject disclosure, in accordance with exemplary embodiments of the present disclosure.

FIG. 11 illustrates an example of the subject disclosure. For instance, in FIG. 11, there is potential for 50% signal energy improvement when using multilayered couplant for ultrasonic testing of materials. As shown in FIG. 11, the graph depicts a curve of diminishing return. Otherwise increased numbers of perfectly matched layers has potentially 3-5 layers as the optimal result. Detecting difficult materials may however warrant more layers. Adapting nanotubes like CNTs by adding other materials than carbon may yield the desired results. The table in FIG. 11 illustrates the numerical values corresponding to the diminishing return.

Exemplary values of the polymer pipe wall example for Polyethylene (PE) are depicted in Table 9:

TABLE 9

| Steps |   |   |   |   |   |   |
|---|---|---|---|---|---|---|
| 1 | PZT Ceramic | Perfect Layer | Optimal | Reflection | Transmission | Transmission |
|   | 28.50 | 7.16 |   | 35.81% | 64.19% | 64.19% |
| 2 | Perfect Layer | PE | 7.16 |   |   |   |
|   | 7.16 | 1.8 |   | 35.79% | 64.21% | 41.22% |

Better impedance may be achieved for layers adjusted for specific classes of pipe/container materials, such as, for instance, thermoplastic pipes. In particular, Tables 10-12 show the performance of using Ultragel II couplant for each pipe wall. Pipes formed from PEX and also PE-RT can be combined with a thin aluminum middle layer to alter performance. In this situation, the aluminum may serve two purposes: as an oxygen barrier and to increase the longitudinal stiffness of the pipe. Details of this alteration are shown in Tables 10-12:

TABLES 10-12

| Steps | | | | | | |
|---|---|---|---|---|---|---|
| 1 | PZT Ceramic 28.50 | Ultragel II 1.80 | Optimal | Reflection 77.65% | Transmission 22.35% | Transmission 22.35% |
| 2 | Ultragel II 1.80 | PVC 3.2844 | 9.67 | 8.52% | 91.48% | 20.45% |

| Steps | | | | | | |
|---|---|---|---|---|---|---|
| 1 | PZT Ceramic 28.50 | Ultragel II 1.80 | Optimal | Reflection 77.65% | Transmission 22.35% | Transmission 22.35% |
| 2 | Ultragel II 1.80 | PE 1.794 | 7.15 | 0.00% | 100.00% | 22.35% |

| Steps | | | | | | |
|---|---|---|---|---|---|---|
| 1 | PZT Ceramic 28.50 | Ultragel II 1.80 | Optimal | Reflection 77.65% | Transmission 22.35% | Transmission 22.35% |
| 2 | Ultragel II 1.80 | PE 2.3674 | 8.21 | 1.85% | 98.15% | 21.94% |

Tables 13-18, below, illustrate using specific material adapted couplant rather that material class adapted couplant leads only to marginal improvement in signal energy.

TABLE 13

| Steps | | | | | | |
|---|---|---|---|---|---|---|
| 1 | PZT Ceramic 28.50 | Nano Gel 8.35 | Optimal | Reflection 29.92% | Transmission 70.08% | Transmission 70.08% |
| 2 | CNT 8.35 | PVC 3.2844 | 9.67 | 18.94% | 81.06% | 56.81% |

TABLE 14

| Steps | | | | | | |
|---|---|---|---|---|---|---|
| 1 | PZT Ceramic 28.50 | CNT 8.35 | Optimal | Reflection 29.92% | Transmission 70.08% | Transmission 70.08% |
| 2 | CNT 8.35 | PE 1.794 | 7.15 | 41.75% | 58.25% | 40.82% |

TABLE 15

| Steps | | | | | | |
|---|---|---|---|---|---|---|
| 1 | PZT Ceramic 28.50 | CNT 8.35 | Optimal | Reflection 29.92% | Transmission 70.08% | Transmission 70.08% |
| 2 | CNT 8.35 | PE 2.3674 | 8.21 | 31.14% | 68.86% | 48.26% |

TABLE 16

| Steps | | | Optimal | Reflection | Transmission | Transmission |
|---|---|---|---|---|---|---|
| 1 | PZT Ceramic 28.50 | Nano Gel 9.67 | | 24.34% | 75.66% | 75.66% |
| 2 | CNT 9.67 | PVC 3.2844 | 9.67 | 24.30% | 75.70% | 57.28% |

TABLE 17

| Steps | | | Optimal | Reflection | Transmission | Transmission |
|---|---|---|---|---|---|---|
| 1 | PZT Ceramic 28.50 | CNT 7.15 | | 35.87% | 64.13% | 64.13% |
| 2 | CNT 7.15 | PE 1.794 | 7.15 | 35.86% | 64.14% | 41.14% |

TABLE 18

| Steps | | | Optimal | Reflection | Transmission | Transmission |
|---|---|---|---|---|---|---|
| 1 | PZT Ceramic 28.50 | CNT 8.21 | | 30.55% | 69.45% | 69.45% |
| 2 | CNT 8.21 | PE 2.3674 | 8.21 | 30.51% | 69.49% | 48.26% |

Together, these tables show that it is more practical to select one couplant design for class of pipes/containers. For instance, thermoplastic pipe class couplant performs reasonably well that the one optimized for each plastic, and it has been found that 3-5 layers are optimal due to diminishing return of the performance curve, as indicated in FIG. 11. Glass has very similar impedance to plastics, but the physical characteristics for the attachment of the sensor, and glass may require different adhesive properties than on the plastic pipes.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for improved, non-intrusive material identification, the system comprising:
a vessel holding or transporting at least one quantity of a fluid;
at least one nanotube transducer positioned on an exterior surface of a sidewall of the vessel, the nanotube transducer formed by a nanotube array positioned within a housing of the nanotube transducer,
wherein the nanotube array within the nanotube transducer creates a vibration medium that substantially reduces acoustic signal degradation and improves a reflection of an acoustic signal emitted from the at least one nanotube transducer; and
a computerized device in communication with the at least one nanotube transducer, the computerized device having a processor and a memory, wherein the computerized device determines a material identification of the quantity of fluid based on, at least in part, the reflection of the acoustic signal.

2. The system of claim 1, wherein the at least one nanotube transducer further comprises first and second nanotube transducers, wherein the vessel is positioned between the first and second nanotube transducers.

3. The system of claim 2, wherein the acoustic signal is transmitted between the first and second nanotube transducers.

4. The system of claim 1, wherein the nanotube array further comprises one of carbon nanotubes (CNT) or multi-walled carbon nanotubes (MWCNT).

5. The system of claim 1, further comprising at least one electrical or mechanical wave stimulating surface positioned on the top of the nanotube array of the at least one nanotube transducer.

6. The system of claim 1, wherein the at least one nanotube transducer comprises first and second nanotube transducers, the first and second nanotube transducers positioned on a single sidewall of the vessel.

7. The system of claim 1, wherein the nanotube array of the nanotube transducer further comprises a plurality of graphene-like sheets positioned substantially parallel to one another.

8. The system of claim 7, further comprising at least one electrical or mechanical wave stimulating surface positioned on the top of the plurality of graphene-like sheets.

9. A system for improved acoustic signal propagation through a medium, the system comprising:
a vessel holding or transporting at least one quantity of a fluid;
at least two acoustic transducers positioned on an exterior surface of a sidewall of the vessel; and
at least one nanotube layer positioned on an exterior surface of the sidewall of the vessel and between each acoustic transducer of the at least two acoustic transducers, wherein an acoustic signal emitted from one of the at least two acoustic transducers is reflected between an interior sidewall of an interior surface of the vessel and an interior surface of the exterior sidewall where the nanotube layer is positioned, wherein the nanotube layer improves a reflection of the acoustic signal emitted from the one of the at least two acoustic transducers.

10. The system of claim 9, wherein the acoustic signal emitted by the one of the at least two acoustic transducers is received by a second of the at least two acoustic transducers.

11. The system of claim 9, wherein the nanotube layer further comprises at least one vertically aligned nanotube array.

12. The system of claim 11, further comprising at least one electrical or mechanical wave stimulating surface positioned on the top of the at least one vertically aligned nanotube array.

13. The system of claim 12, wherein the at least one vertically aligned nanotube array further comprises a plurality of graphene-like sheets positioned substantially parallel to one another.

14. The system of claim 13, further comprising at least one electrical or mechanical wave stimulating surface positioned on the top of the plurality of graphene-like sheets.

* * * * *